(12) United States Patent
Sun et al.

(10) Patent No.: US 12,377,502 B2
(45) Date of Patent: Aug. 5, 2025

(54) AUTOMATIC ASSEMBLY LINE FOR MATTRESS SPRING

(71) Applicant: Dekui Intelligent Equipment(Suzhou) Co., Ltd., Suzhou (CN)

(72) Inventors: Wende Sun, Suzhou (CN); Jiugang Zhang, Bozhou (CN); Lili Yao, Suzhou (CN); Yunlong Cheng, Xingan League (CN)

(73) Assignee: Dekui Intelligent Equipment (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 18/947,509

(22) Filed: Nov. 14, 2024

(65) Prior Publication Data

US 2025/0065457 A1 Feb. 27, 2025

(30) Foreign Application Priority Data

Apr. 10, 2024 (CN) .......................... 202410428187.9

(51) Int. Cl.
*B23P 21/00* (2006.01)
*A47C 23/00* (2006.01)
(Continued)

(52) U.S. Cl.
CPC ............. *B23P 21/004* (2013.01); *B27F 7/05* (2013.01); *B68G 9/00* (2013.01); *A47C 23/00* (2013.01)

(58) Field of Classification Search
CPC ............ B23P 21/004; Y10T 29/53417; Y10T 29/53539; Y10T 29/48–481;
(Continued)

(56) References Cited

U.S. PATENT DOCUMENTS

2013/0112527 A1 5/2013 Monti et al.
2013/0167371 A1 7/2013 Dong et al.
2024/0165647 A1 5/2024 Tiramani et al.

FOREIGN PATENT DOCUMENTS

CN 218285295 U * 1/2023
CN 218285535 U * 1/2023
(Continued)

OTHER PUBLICATIONS

CNIPA, Notification to grant patent right for Chinese application CN202410428187.9, May 15, 2024.

*Primary Examiner* — Matthew P Travers
(74) *Attorney, Agent, or Firm* — Hemisphere Law, PLLC; Zhigang Ma

(57) ABSTRACT

An automatic assembly line for mattress spring, includes a mattress spring conveying mechanism for conveying mattress springs; It also comprises a mattress spring frame assembly mechanism for installing frames on the mattress spring; It also comprises a mattress spring butterfly spring nailing mechanism for installing butterfly springs on the side of the mattress spring; This proposal designs an automatic assembly line for mattress spring, wherein the mattress spring frame assembly mechanism can automatically complete the loading of the frame, the transportation of the mattress spring frame assembly mechanism, the installation between the mattress spring and the frame, and the folding of non-woven fabric after the installation of the mattress spring frame.

5 Claims, 33 Drawing Sheets

(51) Int. Cl.
*B27F 7/05* (2006.01)
*B68G 9/00* (2006.01)

(58) Field of Classification Search
CPC . A47C 17/86; A47C 23/00; A47C 23/04–043; A47C 23/05; B68G 7/00; B68G 9/00; B68G 15/00
See application file for complete search history.

(56) References Cited

FOREIGN PATENT DOCUMENTS

| | | | |
|---|---|---|---|
| CN | 218289518 U | * | 1/2023 |
| CN | 218313267 U | * | 1/2023 |
| CN | 218313326 U | * | 1/2023 |
| CN | 116021260 A | * | 4/2023 |
| CN | 116021484 A | * | 4/2023 |

* cited by examiner

AUTOMATIC ASSEMBLY LINE FOR MATTRESS SPRING

TECHNICAL FIELD

The present invention relates to the field of automation equipment technology, in particular to an automatic assembly line for mattress spring.

BACKGROUND TECHNOLOGY

The spring bed is generally assembled through automated assembly and production; during the assembly process, the frame needs to be fitted onto the edge of the mattress spring, and then the butterfly springs need to be nailed onto the four sides of the mattress spring; The conventional automation equipment provides relatively limited functions during the assembly; for example, some cannot automatically load the frame, some need to manually fold the non-woven fabric on the edge of the mattress spring after installing the frame on the mattress spring, and the mattress spring needs to fix the frame and spring string edge by manually holding a nail gun when nailing the butterfly spring; These will affect the assembly efficiency of the entire product and have a significant impact on the production process of the product.

CONTENTS OF THE INVENTION

To overcome the above shortcomings, the purpose of the present invention is to provide an automatic assembly line for mattress spring, thereby solving the above technical problems.

For the abovementioned purpose, the technical solution adopted by the present invention is: An automatic assembly line for mattress spring comprising:
- A mattress spring conveying mechanism, used for conveying mattress springs, comprising a roller conveyor line;
- Mattress spring frame assembly mechanism, used for installing frames on the mattress spring, comprising:
- At least one frame loading assembly, which comprises a bin for placing frames;
- A frame grabbing assembly, comprising a clamping module and an inner support module, wherein the clamping module is used to clamp the frame and remove it from the bin, and the inner support module is used to spread it apart from the inside of the frame;
- A mattress spring clamping assembly, arranged in the area of the mattress spring assembly frame, used for clamping and fixing the mattress spring;
- A non-woven fabric folding assembly for mattress spring, comprising a folding plate that can fold the non-woven fabric at the edge of the mattress spring after it is fitted with a frame;
- A mattress spring butterfly spring nailing mechanism, used for installing butterfly springs on the side of the mattress spring, comprising:
- A butterfly spring loading assembly, comprising a rack for placing butterfly springs;
- A butterfly spring clamping assembly, comprising a clamping robot for gripping butterfly springs and placing them on the side of the mattress spring;
- A mattress spring positioning and lifting assembly, arranged in the area where the butterfly spring is assembled on the mattress spring, used to lift the mattress spring from the roller conveyor line and clamp and fix;
- A butterfly spring nailing assembly, arranged in the area where the butterfly spring is assembled on the mattress spring, used for nailing on the side of the mattress spring to fix the butterfly spring on the side of the mattress spring.

The beneficial effect of the present invention is that: This proposal designs an automatic assembly line for mattress spring, wherein the mattress spring frame assembly mechanism can automatically complete the loading of the frame, the transportation of the mattress spring frame assembly mechanism, the installation between the mattress spring and the frame, and the folding of non-woven fabric after the installation of the mattress spring frame; The mattress spring butterfly spring nailing mechanism can automatically complete the transportation of the mattress spring, lift, position and fix the mattress spring at designated positions, feed the butterfly spring, and nail the butterfly springs on the four sides of the mattress spring; The entire automatic assembly line for mattress spring presents a high degree of automation without manual operation, which features high assembly efficiency and high assembly accuracy, thereby effectively improving the production process of products.

Further, the frame loading assembly also comprises a guide module, the guide module comprises a rectangular guide bottom frame; one side of the rectangular guide frame is open, and the bin can enter the interior of the rectangular guide bottom frame from the opening; There are two rows of parallel guide wheel sets on both sides of the inner frame of the rectangular guide bottom frame; when the bin enters the rectangular guide bottom frame, the guide wheels come into contact with the edge of the bin; The shape of the inner frame of the rectangular guide bottom frame matches the shape of the base of the mobile bracket to push the mobile bracket into the inner frame of the rectangular guide frame from the opening on one side of the rectangular guide frame, and restrict the entire mobile bracket inside the rectangular guide bottom frame; The guide wheels in the guide wheel set roll at the edge of the mobile bracket, causing the mobile bracket to move more smoothly after entering the rectangular guide bottom frame, and playing an effective guiding role.

Further, the clamping module comprises a clamping jaw, a clamping jaw cylinder, and a telescopic cylinder; the clamping jaw cylinder drives the clamping jaw to clamp the frame, and the telescopic cylinder drives the clamping jaw and clamping jaw cylinder to translate; The inner support module comprises a steel wire support plate and a driving cylinder, wherein the driving cylinder is connected to the steel wire support plate to drive the steel wire support plate to translate; When the clamping module is clamping the frame, it first drives the clamping jaw to extend and approach the frame through the telescopic cylinder, and then the clamping jaw drives the clamping jaw to clamp the steel wire part of the frame; The steel wire support plate can drive the frame to expand outward under the action of the driving cylinder, keeping the frame in an expanded state; in this way, the frame can be directly fitted onto the mattress spring without the need for additional devices for expanding the frame.

Further, the steel wire support plate is equipped with a positioning clamping block at the head, wherein the positioning clamping block is provided with circular arc groove; the bending part of the frame can be clamped in the circular arc groove; The circular arc groove matches the bent part of the frame, and when the expansion structure expands the frame, the force bearing point is selected at the bent part of the frame.

Further, the clamping module also comprises a guide chuck plate, wherein a slot is provided at the bottom of the guide chuck plate, and the guide chuck plate is arranged parallel to the clamping jaw; The guide chuck plate functions to assist the clamping jaw in gripping the frame; when the telescopic cylinder drives the clamping jaw to extend and approach the frame, the guide chuck plate moves synchronously with the clamping jaw, and the steel wire part of the frame enters the slot of the guide chuck plate; in this case, the clamping module and the frame complete the preliminary positioning; in this way, when the clamping jaw is gripping the frame, the frame will not move randomly, effectively ensuring that the clamping jaw can quickly grip the frame.

Further, the mattress spring clamping assembly comprises a positive clamping plate module, a positive clamping plate driving mechanism, a side clamping block module, and a side clamping block driving module, wherein:

The positive clamping plate module comprises two symmetrical clamping plates arranged on the roller conveyor line to clamp the front and rear sides of the mattress spring;

The positive clamping plate driving mechanism drives the two clamping plates in the positive clamping plate module to move to clamp the mattress spring or retract to avoid the mattress spring;

The side clamping block module comprises two symmetrical clamping blocks arranged on the roller conveyor line to clamp the left and right sides of the mattress spring;

The side clamping block driving module drives two clamping blocks in the side clamping block module to move and clamp the mattress spring; With two symmetrical clamping plates and two symmetrical clamping blocks, the mattress spring is clamped from the front, back, left, and right sides, so that the mattress spring is positioned on the roller conveyor line for easy installation of the frame and nailing in the future; The two symmetrical clamping blocks located on the roller conveyor line can be translated and lifted by the positive clamping plate driving mechanism, so that the clamping blocks can clamp the mattress spring, and descend and retract without blocking the normal movement of the mattress spring on the roller conveyor line.

Further, the positive clamping plate driving mechanism comprises a first translation driving device including a first telescopic motor with the telescopic end acting on the clamping plate to drive the clamping plate to translate; The first translation driving device also comprises a first guide plate, wherein a translation track is provided on the first guide plate, the clamping plate is provided on the movable seat, and the movable seat moves on the translation track; The clamping plate is driven by the first telescopic motor to translate; one clamping plate corresponds to one telescopic motor; during the operation, both clamping plates move inward or outward simultaneously; The translation track on the first guide plate can play a limiting role in guiding the clamping plate, keeping it translate in a straight line; The two symmetrical clamping blocks located on the roller conveyor line can be translated and lifted by the positive clamping plate driving mechanism, so that the clamping blocks can clamp the mattress spring, and descend and retract without blocking the normal movement of the mattress spring on the roller conveyor line.

Further, the positive clamping plate driving mechanism also comprises a lifting driving device including a second telescopic motor with the telescopic end connected to the clamping plate to drive the clamping plate to lift; The lifting driving device also comprises a second guide plate, and a lifting track is also provided on the second guide plate; the clamping plate is movable on the lifting track; With the second telescopic motor to drive the clamping plate for lifting, one clamping plate corresponds to one telescopic motor; when it is necessary to position and fix the mattress spring, the clamping plate is driven by the second telescopic motor to extend from below the roller conveyor line; after the mattress spring frame is installed, the second telescopic motor drives the clamping plate to descend and retract, so that the next mattress spring will not be blocked when moving; The translation track on the second guide plate can play a limiting role in guiding the clamping plate, keeping it lift in a straight line.

Further, the side clamping block driving module comprises a second translation driving device with the same structure as the first translation driving device.

Further, the folding plate is equipped with a bend, with a support plate at one folded edge and an edge hook plate at the other folded edge; The end of the edge hook plate is provided with a guide slope, and the end of the guide slope is provided with a serrated surface; The support plate functions to fix the entire folding plate, so as to facilitate the fixation and installation of the folding plate with other parts of the equipment; The guide slope allows the end of the edge hook plate to better act on the non-woven fabric, thereby enabling the edge hook plate to drive the non-woven fabric to fold; The serrated surface on the end face of the edge hook plate can allow the edge hook plate to effectively hook the surface of the non-woven fabric, so that the edge hook plate drives the non-woven fabric to fold without detachment between the edge hook plate and the non-woven fabric.

Further, the non-woven fabric folding assembly for mattress spring also comprises a rotating mechanism including a transmission structure; the transmission structure comprises a lifting support, a transmission plate, a connecting rod, and a rod seat; one end of the connecting rod is hinged to the first end of the lifting support, and the other end of the connecting rod is hinged to the rod seat; the rod seat is fixedly arranged on the transmission plate, and the second end of the lifting support is hinged to the transmission plate; the folding plate is fixedly connected to the transmission plate; The rotating mechanism also comprises a driving structure including a lifting driving cylinder that can drive the lifting support to lift and lower; The driving structure also comprises a base, on which a linear lifting track is provided, and the lifting support is movable on the linear lifting track with the help of a slider; When the lifting support is lifted up and down under the action of the driving device, it drives the connecting rod that drives the rod seat; under the action of the connecting rod mechanism, the linear driving force of the lifting support can be converted into the rotational force of the transmission plate, so that the transmission plate drives the folding plate to flip and the folding plate drives the non-woven fabric edge of the mattress spring to flip; The lifting cylinder can drive the lifting support to go up and down; The linear lifting track can guide the lifting support, allowing the lifting support to move up and down within the range of the linear lifting track.

Further, the mattress spring frame assembly mechanism also comprises a nailing assembly that is arranged above the roller conveyor line and corresponds to the positioning mechanism, for nailing and fixing at the position of non-woven fabric wrapped around the frame of the mattress spring; The nailing assembly comprises several nail guns arranged above the roller conveyor line, each nail gun being connected to a three-axis driving module; the three-axis driving module can drive the nail gun to move and fix the nails at the position of non-woven fabric wrapped around the frame of the mattress spring.

Further, it also comprises a mattress spring front frame installation station and a mattress spring back frame installation station, and the structures of the two installation stations are the same; a mattress spring flipping device is arranged between the two installation stations, which is used to flip the mattress spring 180 degrees.

The mattress spring flipping device also comprises a mounting base and a first flip bracket, wherein the first flip bracket is rotatably arranged on the mounting base; It also comprises a second flip bracket, wherein the second flipping bracket is rotatably arranged on the mounting base, and the first flip bracket and the second flip bracket correspond vertically to each other and are synchronously flipped; It also comprises a first fixture assembly located on the inner side of the first flip bracket and movable back and forth along the direction of the first flip bracket; It also comprises a second fixture assembly located on the inner side of the second flip bracket and movable back and forth along the direction of the second flip bracket.

By control of the relative movement of the first fixture assembly and the second fixture assembly, the mattress spring is clamped; then, with the help of the synchronous flipping of the first flip bracket and the second flip bracket, the mattress spring clamped by the two fixture assemblies is flipped together, providing a 180° automatic flipping of the mattress spring without manual flipping, with high efficiency and no change in position.

The first fixture assembly comprises a first clamping seat for clamping the mattress spring, wherein a first synchronous belt capable of automatic transmission is provided on the first clamping seat, the first clamping seat is fixed at the lower end of the first guide column, and the first guide column is connected to the first motor for transmission; The second fixture assembly comprises a second clamping seat for clamping the mattress spring, wherein a second synchronous belt capable of automatic transmission is provided on the second clamping seat, the second clamping seat is fixed at the lower end of the second guide column, and the second guide column is connected to the second motor for transmission.

By use of the fixture assemblies to flip the mattress spring, the incoming material docking and non-offset conveying of the mattress spring are also completed through synchronous belts, with a high conveying accuracy, making it easy to dock with the processing equipment and improving the production and processing efficiency.

There are two first clamping seats, each of which is connected to two first guide columns; the two first clamping seats move up and down synchronously through the first motor; There are two second clamping seats, each of which is connected to two second guide columns; the two second clamping seats move up and down synchronously through the second motor.

Two clamping seats are arranged above and below the mattress spring to improve the stability of clamping the mattress spring by the clamping seats; Two guide columns are arranged on each clamping seat to maintain the clamping force and stability of the clamping seat on the mattress spring.

The mounting base comprises a bottom plate and left and right supports arranged at both ends of the bottom plate; the first flip bracket and the second flip bracket are both arranged between the left and right supports.

The left and right supports are arranged at both ends of the bottom plate, and two flip brackets are arranged between the left and right supports to provide a sturdy and stable structure, thereby maintaining the structural stability of the mattress spring during the flipping.

The left end of the first flip bracket and the left end of the second flip bracket are both rotatably arranged on the left support, and the right end of the first flip bracket and the right end of the second flip bracket are both rotatably arranged on the right support.

The two ends of the first flip bracket and the two ends of the second flip bracket are correspondingly arranged on the supports on the left and right sides, respectively, to facilitate the synchronous installation of the flipping structure and the arrangement of the power system.

The first flip bracket and the second flip bracket are both connected to a third motor for transmission.

The two flip brackets are rotated by a third motor to automatically flip, with a high efficiency.

The left end of the first flip bracket is fixedly connected to the left end of the second flip bracket, and the right end of the first flip bracket is fixedly connected to the right end of the second flip bracket.

The ends of the first and second flip brackets on the same side are fixedly connected to facilitate overall installation and maintain the stability of the overall structure.

The left and right ends of the mounting base are equipped with lifting lugs.

The lifting lugs are arranged at both ends of the mounting base, which can be used to lift the entire mechanism for easy handling and transfer.

Further, the rack is arranged on the turntable and evenly distributed around the turntable, with butterfly springs stacked on the rack; The turntable can be driven by the motor to rotate, and the rack on the turntable changes its position with the turntable; the butterfly springs are stacked on each rack to provide uninterrupted loading; the clamping module removes the butterfly springs stacked on the rack to provide automatic loading; when the butterfly springs on one rack are completely removed, the turntable can rotate to move another full rack to the picking area of the clamping module.

Further, one side of the turntable is provided with a dual-axis clamping module and a buffer rack; the buffer rack is provided with several positioning slots arranged in a straight line, and the butterfly springs are placed in the positioning slots; A buffer area is arranged on one side of the turntable rack; the butterfly springs on the rack are first removed by the dual-axis clamping module and placed on the buffer rack in the buffer area; the buffer rack is provided with several positioning slots arranged in a straight line, and one butterfly spring is placed in each positioning slot; when a row of positioning slots is filled with butterfly springs, the clamping robot can remove all the butterfly springs on the buffer rack at once, which can improve the efficiency of picking; in the meantime, the row of removed butterfly springs can be nailed to the side of the mattress spring at once; The dual-axis clamping module comprises a clamping jaw and a dual-axis driving module; the dual-axis driving module can drive the clamping jaw to translate and lift, so that the clamping jaw can remove the butterfly spring from the rack and place it on the buffer rack.

Further, the picking end of the clamping robot comprises a mounting plate, on which several clamping blocks arranged in a straight line are provided; the clamping blocks are correspondingly arranged with the positioning slots on the buffer rack, and one clamping block corresponds to a butterfly spring for clamping; When the clamping robot picks materials from the buffer rack, the clamping blocks on the mounting plate can remove the butterfly springs from the positioning slots; each clamping block corresponds to the butterfly spring being removed from one positioning slot; the linearly arranged clamping blocks can remove a row of butterfly springs at once and directly attach them to the side of the mattress spring; then, the nailing mechanism nails this row of butterfly springs to the side of the mattress spring in sequence.

Further, the mattress spring positioning and lifting assembly comprises a positioning module and a lifting module; the lifting module is arranged below the positioning module and can pass through the roller conveyor line to lift the mattress spring from the roller conveyor line and reach the positioning module; the positioning module can position and fix the mattress spring; When nailing the side of the mattress spring with butterfly springs, the bottom of the mattress spring is located on the roller conveyor line, which is not convenient for the operation of the nailing robot, and it is also necessary to maintain the stability of the mattress spring position during the nailing process; Therefore, a lifting component below the mattress spring can lift the mattress spring to a suitable position for nailing, avoiding collision with the conveying component during the nailing and improving the processing efficiency; And a positioning component is arranged above the mattress spring, it plays a role in fixing the mattress spring when nailing the side of the mattress spring, avoiding nailing misalignment and further maintaining the stability of the mattress spring position.

Further, the positioning module comprises a first clamping portion and a second clamping portion, wherein the first clamping portion is arranged along the X direction and the second clamping portion is arranged along the Y direction; The first clamping portion and the second clamping portion are both capable of relative or opposite movement to adjust the clamping positioning of the mattress spring; Two clamping portions move in two directions while clamping and fixing the four sides of the mattress spring.

Further, both the first clamping portion and the second clamping portion also comprise a first bottom plate and a first push plate, wherein the first bottom plate is fixed on the truss, and the first push plate is connected to the first bottom plate through a sliding rail; they also comprise a first telescopic cylinder with one end connected to the first push plate and the other end fixed on the truss; the first telescopic cylinder can push the first push plate to move relative to the first bottom plate;

The first clamping portion and the second clamping portion also comprise a second bottom plate and a second push plate, wherein the second bottom plate is fixed on the end of the first bottom plate, and the second push plate is connected to the second bottom plate through a sliding rail; they also comprise a second telescopic cylinder with one end connected to the second push plate and the other end fixed on the second bottom plate; the second telescopic cylinder can push the second push plate to move relative to the second bottom plate.

Further, the lifting module comprises a base, a lifting plate, and a scissor fork assembly, wherein one side of the scissor fork assembly is a fixed end and the other side is a sliding end; The scissor fork assembly is symmetrically arranged on both sides, providing support and balance for the mattress spring and improving the stability of mattress spring during the processing; The upper and lower ends of the fixed end are hinged to the lifting plate and the base through hinged supports, respectively; the upper and lower ends of the sliding end are respectively provided with upper and lower sliding guide devices; The upper sliding guide device and the lower sliding guide device are also provided with a limit function to ensure that after lifting, the mattress spring will not slide at the upper and lower sliding ends during the nailing process, and will be lifted stably; The scissor fork assembly comprises two cross-connected lifting rods that are rotatably connected by a pin shaft; It can maintain the stability during the lifting process, stably supporting the lifting frame above the support and maintaining the stability of the mattress spring processing above.

Further, the roller conveyor line comprises a first roller conveyor line and a second roller conveyor line; the conveying direction of the first roller conveyor line is perpendicular to that of the second roller conveyor line; the end of the first roller conveyor line is connected to the head of the second roller conveyor line, and a lifting and transferring mechanism is provided at the connection point between the two; In the entire workflow, it is necessary to nail butterfly springs on all four sides of the mattress spring; the mattress spring needs to be nailed with butterfly springs on its left and right sides on the first roller conveyor line, and transferred from the first roller conveyor line to the second roller conveyor line through a lifting and transferring mechanism; the butterfly springs need to be nailed on the front and rear sides of the mattress spring on the second roller conveyor line to complete the work of nailing butterfly springs on all four sides of the mattress spring.

Further, the lifting and transferring mechanism comprises a mattress spring support frame, and a lifting bracket that can be lifted and lowered is provided below the mattress spring support frame; a conveying module is provided on the lifting bracket, and the conveying direction of the conveying module is perpendicular to the direction in which the mattress spring moves to the mattress spring support frame; when the lifting bracket rises to contact the mattress spring, the conveying module can move the mattress spring from the first roller conveyor line to the second roller conveyor line; Before the mattress spring is transferred to the mattress spring support frame, the conveying module on the lifting bracket is lower than the mattress spring support frame; After the mattress spring is transferred to the mattress spring support frame, the lifting bracket moves upward, driving the conveying module to come into contact with the mattress spring. Now, the conveying module starts working to transfer the mattress spring to the next station.

Further, it also comprises a telescopic driving assembly and a lifting assembly arranged on the framework, wherein the lifting assembly comprises a lifting rotary frame hinged to the framework and the lifting bracket, and the telescopic driving assembly can drive the lifting rotary frame to rotate around the hinge point formed with the framework to lift and lower the lifting bracket; The telescopic driving assembly provides power for the lifting of the lifting bracket, which can meet the needs of moving the mattress spring from the previous station to the mattress spring support frame, avoiding interference during the process of moving the mattress spring to the mattress spring support frame. The telescopic driving assembly can be a telescopic cylinder or other known mechanical mechanism that can drive the lifting rotary frame to rotate, which is a prior art and will not be further described here.

Further, the lifting rotary frame comprises a first hinged end, a second hinged end, and a third hinged end, wherein the first hinged end is hinged on the lower surface of the lifting bracket, the second hinged end is hinged on the framework, and the third hinged end is hinged to the telescopic driving assembly; The number of lifting rotary frames in a set of lifting assembly is not limited, which may be 1, 2, or more; During the lifting process, two sets of lifting assemblies can cause the lifting bracket to lift more smoothly, avoiding the phenomenon of tilting during the lifting and ensuring that the mattress spring can move steadily to the next station. Both hinged end 1 and hinged end 2 can be hinged by the bearing bracket.

Further, the conveying module is connected to the lifting bracket through a conveying bracket, and the conveying module comprises a conveyor chain arranged around the conveying bracket; The conveying bracket is adjustable in height through its vertical plate and lifting bracket to meet different types of mattress spring requirements. The conveying bracket is also provided with a striker plate parallel to the conveyor chain, maintaining the precise position of the mattress spring when transferred to the next station.

Further, it also comprises several driven gear sets corresponding to the conveying module; the driven gear set comprises upper and lower gears arranged in a staggered manner; the upper gear is arranged on the conveying bracket, and the lower gear is correspondingly arranged on the lifting bracket; the lifting bracket is provided with a driving connecting rod along its length, and the driving connecting rod sequentially passes through the lower gear and is connected to its bearing; the upper gear and the lower gear can be used for the conveyor chain to pass through and mesh with them; The lower gear rotates to drive the rotation of the conveyor chain, and the two upper gears can also assist in driving the movement of the conveyor chain under the rotation of the lower gear. Therefore, the conveyor chain can transfer the mattress spring to the next station.

Further, it also comprises a conveyor driving assembly that comprises a driving motor arranged on the lifting bracket and a driving main gear and a driving slave gear that mesh with each other.

Further, the driving connecting rod goes through the driving slave gear and is connected to its bearing; The linkage between multiple conveying modules is provided by use of the driving connecting rod to provide multiple conveying forces for the movement of the mattress spring, thereby improving the mattress spring's conveying efficiency.

In the entire lifting and transferring mechanism, the mattress spring support frame, lifting assembly and conveying module cooperate with each other; the mattress spring support frame provides support for the placement of the mattress spring at the lifting and transfer location; the initial movement directions of the conveying module and the mattress spring are arranged at a 90-degree angle, which completes the 90-degree track change of the mattress spring, so that the two sides of the mattress spring that have not completed the installation of the butterfly spring's staple bolt are in the direction of the mattress spring transfer, facilitating the complete staple bolting of the butterfly spring on the mattress spring; the lifting assembly can effectively avoid interference of the conveying module during the mattress spring transfer process.

DESCRIPTION ON THE ATTACHED FIGURES

Figure 1:
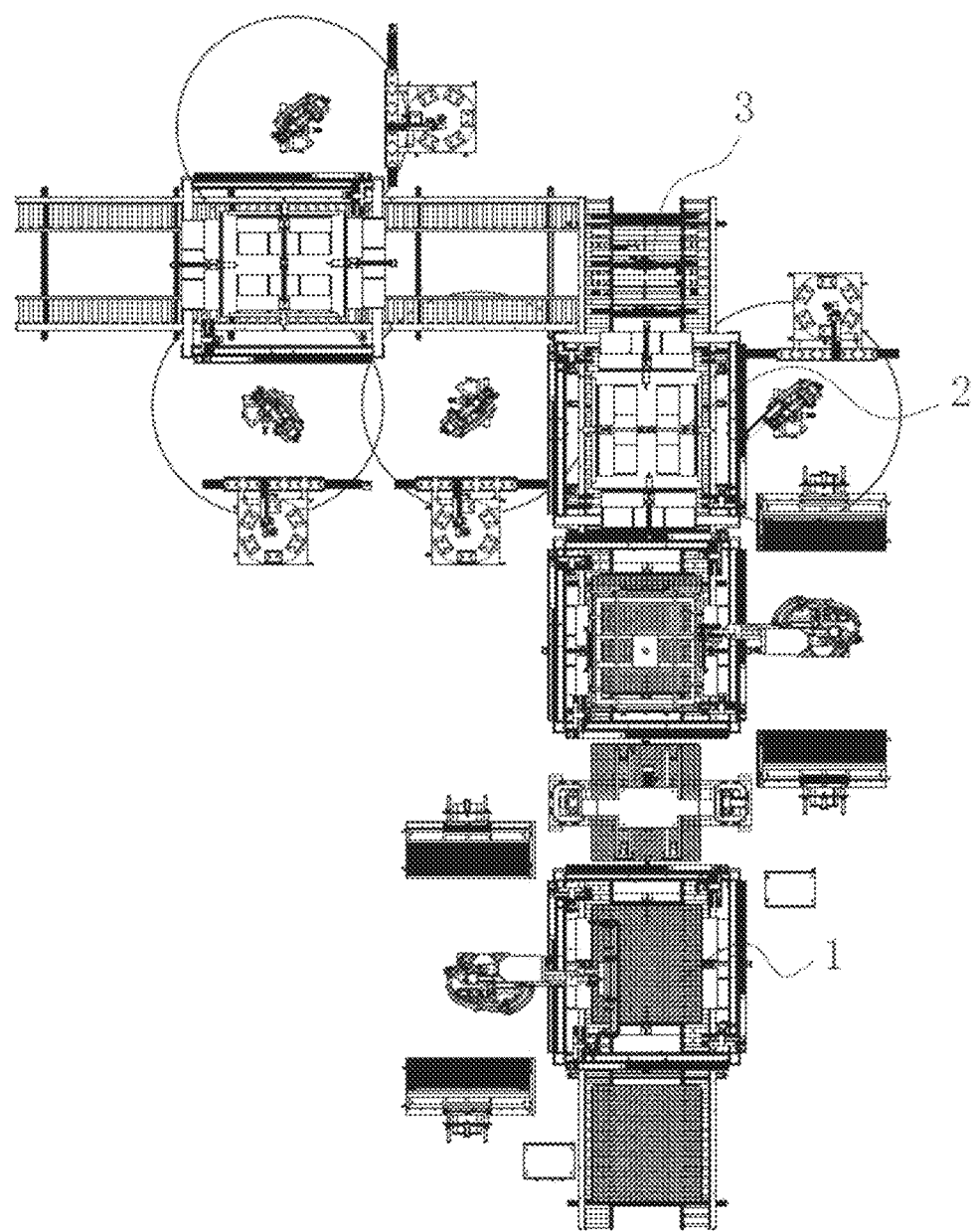
FIG. 1 is a schematic diagram of the overall structure of an automatic assembly line for mattress spring according to an embodiment of the present invention.

In the figure:
1. Mattress spring frame assembly mechanism;
1.1. Frame loading assembly;
1.11. Bin; 1.12. Guide module; 1.13. Positioning module;
1.111. Mobile bracket; 1.112. Floating steel wire hanger; 1.113. Cantilever; 1.114. Positioning slot;
1.121. Rectangular guide bottom frame; 1.122. Guide wheel set;
1.131. Positioning female end; 1.132. First support plate; 1.133. Positioning male end; 1.134. Second support plate; 1.135. Support beam; 1.136. Base plate; 1.137. Telescopic cylinder; 1.138. Optic axis;
1.2. Frame grabbing assembly;
1.21. Clamping module; 1.22. Inner support module;
1.211. Clamping jaw; 1.212. Clamping jaw cylinder; 1.213. Telescopic cylinder; 1.214. Guide chuck plate; 1.215. Slot;
1.221. Steel wire support plate; 1.222. Driving cylinder; 1.223. Positioning clamping block; 1.224. Circular arc groove;
1.3. Mattress spring positioning assembly;
1.31. Positive clamping plate module; 1.32. Positive clamping plate driving mechanism; 1.33. Side clamping block module; 1.34. Side clamping block driving module;
1.311. Clamping plate;
1.321. First telescopic motor; 1.322. First guide plate; 1.323. Translation track; 1.324. Movable seat; 1.325. Second telescopic motor; 1.326. Second guide plate; 1.327. Lifting track;
1.5. Non-woven fabric folding assembly for mattress spring;
1.51. Folding plate; 1.52. Lifting support; 1.53. Transmission plate; 1.54. Connecting rod; 1.55. Rod seat; 1.56. Driving cylinder; 1.57. Base; 1.58. Linear lifting track;
1.511. Support plate; 1.512. Edge hook plate; 1.513. Serrated surface;
1.6. Frame nailing mechanism;
1.7. Mattress spring flipping device;
1.71. Mounting base; 1.72. First flip bracket; 1.73. Second flip bracket; 1.74. First fixture assembly; 1.75. Second fixture assembly; 1.76. Third motor; 1.77. Lifting lug;
1.711. Bottom plate; 1.712. Left support; 1.713. Right support;
1.741. First clamping seat; 1.742. First synchronous belt; 1.743. First motor; 1.744. First guide column;
1.751. Second clamping seat; 1.752. Second synchronous belt; 1.753. Second motor; 1.754. Second guide column.
2. Mattress spring butterfly spring nailing mechanism;
2.1. Butterfly spring loading assembly;
2.11. Rack; 2.12. Turntable; 2.13. Dual-axis clamping module; 2.14. Buffer rack; 2.15. Positioning slot;
2.2. Butterfly spring clamping assembly;
2.21 Mounting plate; 2.22. Clamping block; 2.23. Clamping robot;
4.4. Mattress spring positioning and lifting assembly;
4.43. Truss; 4.44. Positioning component; 4.45. Lifting component;
4.441. First clamping portion;
4.4411. First bottom plate; 4.4412. First push plate; 4.4413. Second bottom plate; 4.4414. Second push plate; 4.4415. Telescopic cylinder; 4.4417. Sliding rail;
4.442. Second clamping portion;
4.451. Base; 4.452. Lifting plate; 4.453. Scissor fork assembly;
4.4531. Fixed end; 4.4532. Sliding end; 4.4533. Pin shaft; 4.4534. Lifting rod;
2.5. Butterfly spring nailing assembly;
4.6. Lifting and transferring mechanism;
4.61. Framework; 4.62. Mattress spring support frame; 4.63. Lifting bracket; 4.64. Lifting assembly; 4.65. Conveying module; 4.66. Conveyor driving assembly; 4.67. Bearing bracket; 4.69. Driving connecting rod; 4.610. Driven gear set;
4.641. Telescopic driving assembly; 4.642. Lifting rotary frame;
4.6421. First hinged end; 4.6422. Second hinged end; 4.6423. Third hinged end;
4.651. Conveyor chain; 4.652. Conveying bracket; 4.653. Striker plate;
4.661. Driving motor; 4.662. Driving main gear; 4.663. Driving slave gear;
4.6101. Upper gear; 4.6102. Lower gear.
3. Mattress spring conveying mechanism.

Specific Embodiment

The preferred embodiments of the present invention will be elaborated in detail with reference to the attached figures, in order to facilitate the understanding of the advantages and features of the present invention by those skilled in the art and provide a clearer and more precise definition of the scope of protection of the present invention. Please refer to FIGS. 1-33. Note that in the description of the present invention, it needs to explain that the orientation or location relationships indicated by the terms "center", "upper", "lower", "left", "right", "vertical", "horizontal", "internal", "external", etc. are those shown based on the attached figures, or the usual orientation or location relationships when the product of the present invention is in use, which is only for describing the present invention and simplifying the description more conveniently but not for indicating or implying that the referred device or element must have a specific orientation for construction and operation, so they cannot be understood as limiting the present invention. In addition, the terms "first", "second" and "third" are only used for distinguishing descriptions and cannot be understood as indicating or implying the relative importance. The terms "horizontal", "vertical", "suspension", etc. do not imply that the component is required to be absolutely horizontal or suspended, but may be slightly tilted. For example, "horizontal" only refers to its direction being more horizontal relative to "vertical", which does not necessarily mean that the structure must be completely horizontal, but may be slightly tilted.

Figure 2:
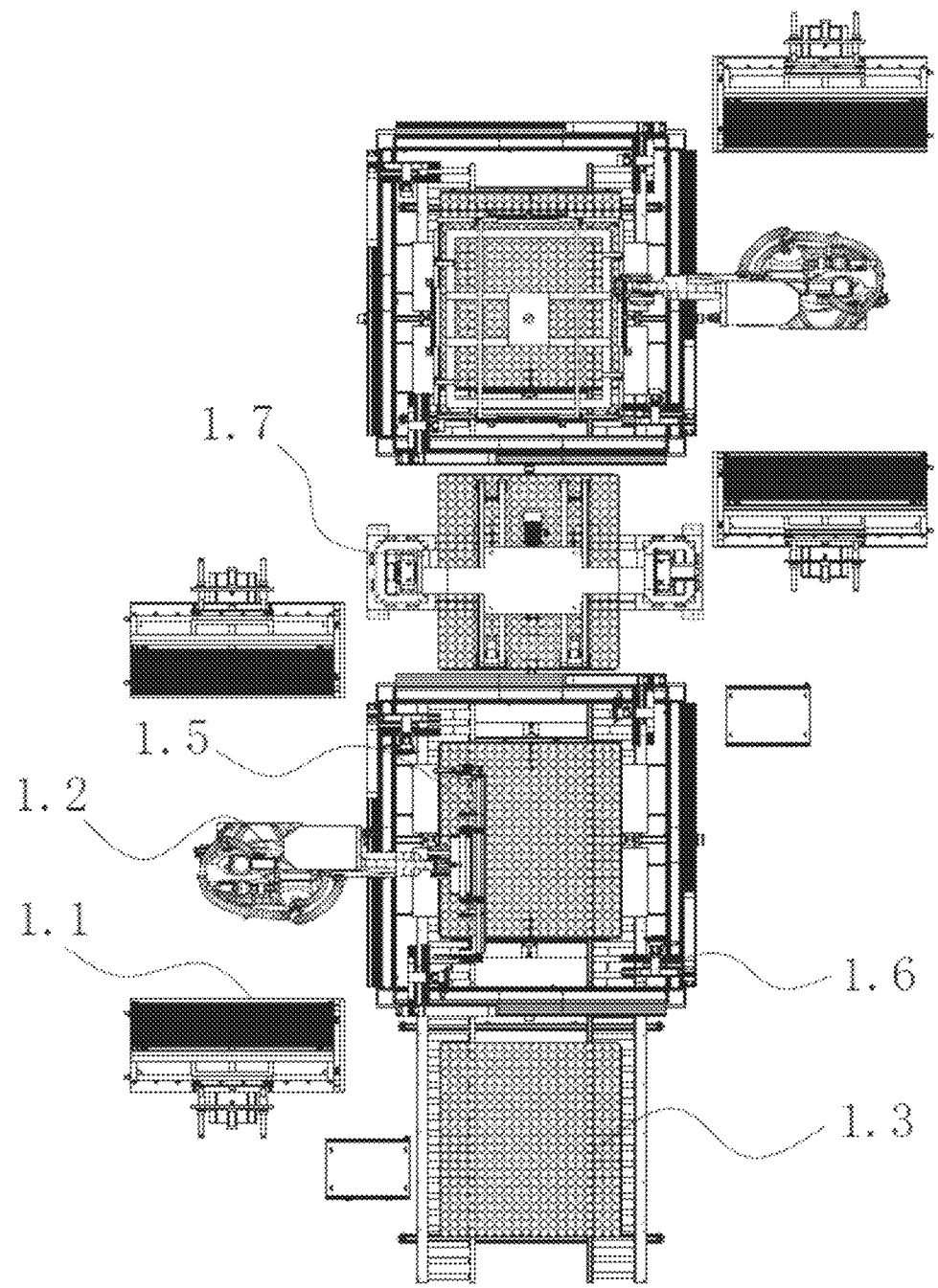
FIG. 2 is a structure schematic diagram of mattress spring frame assembly mechanism according to an embodiment of the present invention.

As shown in FIG. 1, an automatic assembly line for mattress spring in this embodiment comprises a mattress spring conveying mechanism 3 for conveying the mattress spring, which comprises a roller conveyor line;

As shown in FIG. 2, the mattress spring frame assembly mechanism 1 is used to install frames on the mattress spring, which comprises two frame loading assemblies 1.1, frame grabbing assembly 1.2, mattress spring clamping assembly 1.3, non-woven fabric folding assembly for mattress spring 1.5, nailing assembly, and mattress spring butterfly spring nailing mechanism 2. An automatic assembly line for mattress spring of this application can automatically complete the loading of the frame, the transportation of the mattress spring, the installation between the mattress spring and the frame, and the folding of non-woven fabric after the installation of the mattress spring frame; It can automatically complete the transportation of the mattress spring, lift, position and fix the mattress spring at designated positions, feed the butterfly spring, and nail the butterfly springs on the four sides of the mattress spring; The entire automatic assembly line for mattress spring presents a high degree of automation without manual operation, which features high assembly efficiency and high assembly accuracy, thereby effectively improving the production process of products.

As shown in FIGS. 3-6, the frame loading assembly 1.1 comprises a bin 1.11 that is used to place the frame.

In one or more embodiments, the bin 1.11 comprises a mobile bracket 1.111 and a floating steel wire hanger 1.112, with the floating steel wire hanger 1.112 fixedly mounted on the mobile bracket 1.111 and the frame placed on the floating steel wire hanger 1.112; The floating steel wire hanger 1.112 comprises four rectangular cantilevers 1.113, each of which is uniformly provided with several positioning slots 1.215, and a frame is placed in one positioning slot 1.215.

The bottom of the mobile bracket 1.111 is provided with a universal wheel that can drive the mobile bracket 1.111 to move; the frame is arranged on the floating steel wire hanger 1.112 to push the mobile bracket 1.111 to a designated position; the frame on the floating steel wire hanger 1.112 can be removed by a manipulator; after the frame on the bin is removed, it can be replaced with another bin filled with frames, thereby achieving the purpose of uninterrupted loading; The four rectangular cantilevers 1.113 correspond to the shape of the frame, and the frame can be directly hung on the four cantilevers 1.113; the four cantilevers 1.113 correspond to the positions of the four corners of the frame; in the meantime, the cantilevers 1.113 are provided with positioning slots 1.114, with one positioning slot 1.114 corresponding to one frame; therefore, a set of cantilevers 1.113 can accommodate multiple frames in a row, and the manipulator picks frames one by one during the picking.

Figure 3:
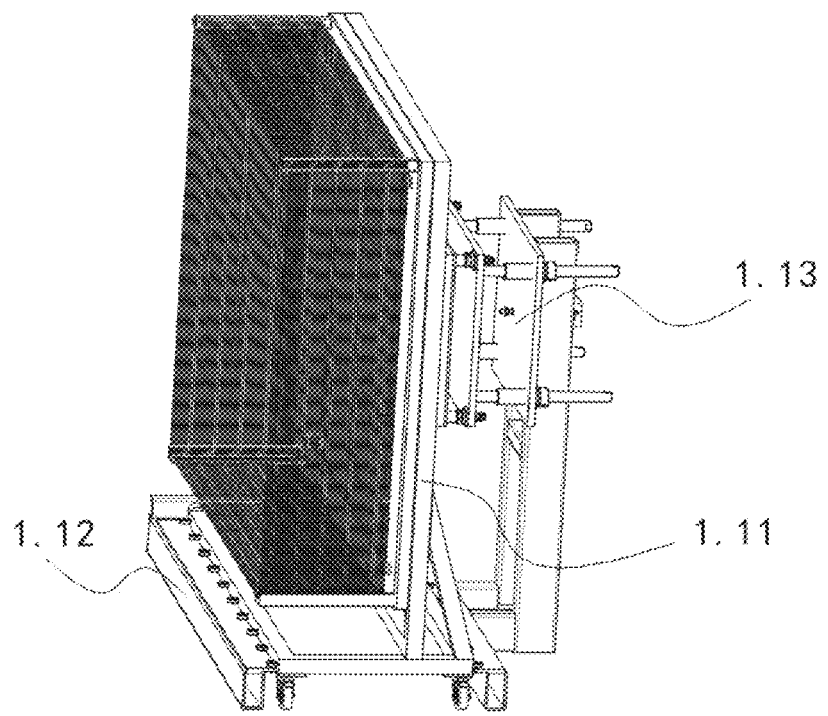
FIG. 3 is a schematic diagram of a frame loading assembly according to an embodiment of the present invention.
Figure 4:
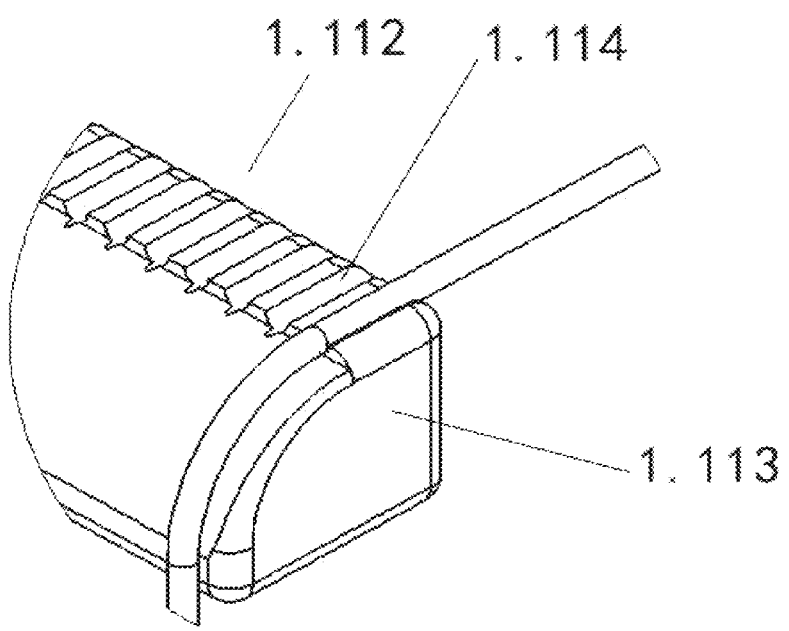
FIG. 4 is an enlarged structure schematic diagram of a floating steel wire hanger according to an embodiment of the present invention.
Figure 5:
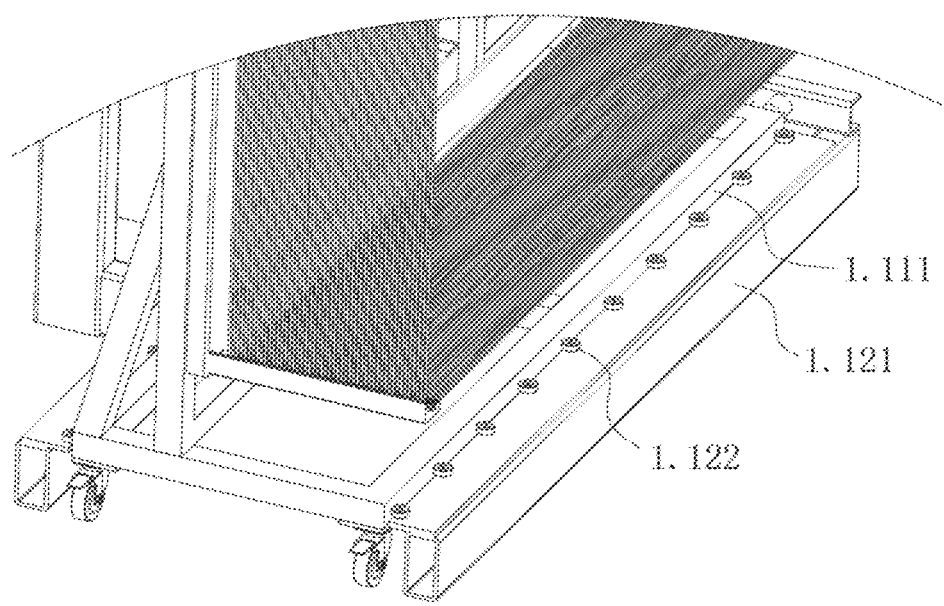
FIG. 5 is an enlarged structure schematic diagram of a rectangular guide bottom frame according to an embodiment of the present invention.
Figure 6:
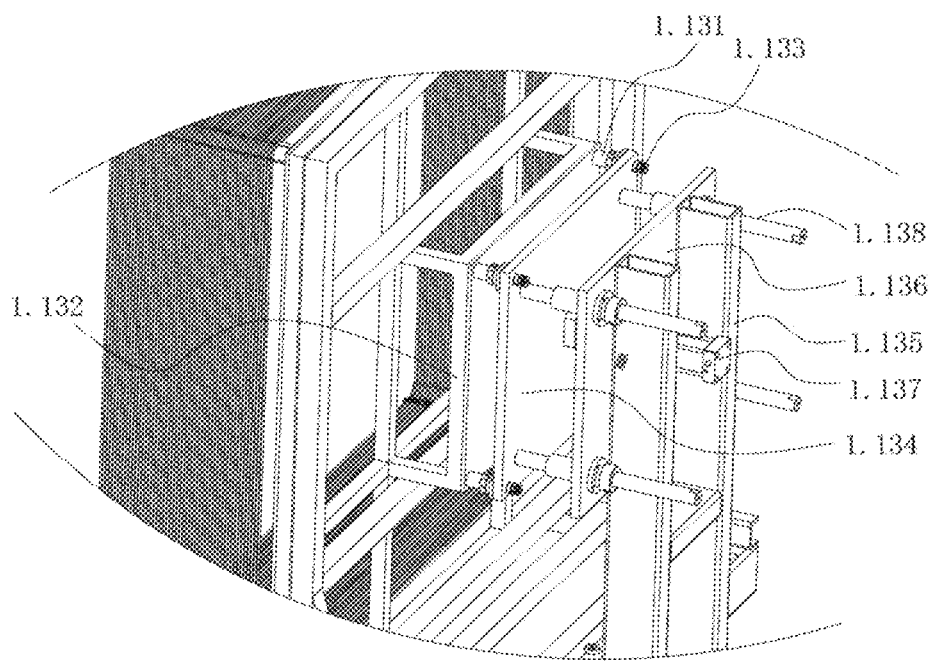
FIG. 6 is an enlarged structure schematic diagram of the positioning male end and female ends according to an embodiment of the present invention.

As shown in FIGS. 3 and 4, the frame can be placed in a way where the upper edge is placed on the upper surface of the cantilever 1.113 above and the lower edge is placed on the upper surface of the cantilever 1.113 below; accordingly, it is convenient to take and place the frame, and the position of the frame can be placed in a stable and controllable manner. The frame can also be arranged on the outer side of each cantilever 1.113 (i.e. on the upper surface of the cantilever 1.113 above and the lower surface of the cantilever 1.113 below).

In one or more embodiments, the frame loading assembly 1.1 also comprises a guide module 1.12 that comprises a rectangular guide frame 1.121 with one side open, and the bin can enter the interior of the rectangular guide bottom frame 1.121 from the opening.

There are two parallel guide wheel sets 1.122 on both sides of the inner frame of the rectangular guide bottom frame 1.121; when the bin enters the rectangular guide bottom frame 1.121, the guide wheels come into contact with the edge of the bin; The shape of the inner frame of the rectangular guide bottom frame 1.121 matches the shape of the base of the mobile bracket 1.111 to push the mobile bracket 1.111 into the inner frame of the rectangular guide frame from the opening on one side of the rectangular guide frame, and restrict the entire mobile bracket 1.111 inside the rectangular guide bottom frame 1.121; The guide wheels in the guide wheel set 1.122 roll at the edge of the mobile bracket 1.111, causing the mobile bracket 1.111 to move more smoothly after entering the rectangular guide bottom frame 1.121, and playing an effective guiding role.

In one or more embodiments, the frame loading assembly 1.1 also comprises a positioning module 1.13 that comprises a positioning female end 1.131 fixedly arranged on the mobile bracket 1.111, and a positioning male end 1.133 fixedly arranged on the rectangular guide bottom frame 1.121; the mobile bracket 1.111 is fixed to the rectangular guide bottom frame 1.121 by mutual insertion of the positioning male end 1.133 and the positioning female end 1.131.

The positioning female end 1.131 and the positioning male end 1.133 are coordinated for insertion, thereby fixing the mobile bracket 1.111 and the rectangular guide bottom frame 1.121 together; as the position of the rectangular guide bottom frame 1.121 is fixed, this structure can effectively position and fix the mobile bracket 1.111.

The positioning female end 1.131 comprises a first support plate 1.132 fixedly installed on the mobile bracket 1.111, and the first support plate 1.132 is provided with a female head that is provided with a positioning hole;

The positioning male end 1.133 comprises a second support plate 1.134 fixedly installed on the rectangular guide bottom frame 1.121; the second support plate 1.134 is provided with a male, and the male is provided with a positioning column that can be inserted into the positioning hole; The principle of coordinating the positioning of the positioning female end 1.131 and the positioning male end 1.133 is as follows: When the mobile bracket 1.111 is pushed into the rectangular guide bottom frame 1.121, the second support plate 1.134 with its male approaches the female on the first support plate 1.132, so that the positioning column on the male is inserted into the positioning hole on the female; the male and female can rely on the magnetic attraction to cause the positioning column to be attached to the positioning hole, thereby locking the positioning male end 1.133 and the positioning female end 1.131 together.

In one or more embodiments, a support beam 1.135 is provided at the rectangular guide bottom frame 1.121, and a base plate 1.136 is provided on the support beam 1.135; the base plate 1.136 is provided with an optic axis 1.138, and the second support plate 1.134 is fitted on the optic axis 1.138; the base plate 1.136 is also provided with a telescopic cylinder 1.213 with the action end connected to the second support plate 1.134.

The driving structure used for the second support plate 1.134 to approach the first support plate 1.132 is a guiding optic axis 1.138 combined with a telescopic cylinder 1.137; the guiding optical axis 1.138 plays a guiding role, and the telescopic cylinder 1.137 is the actuator that drives the second support plate 1.134 to move on the optic axis 1.138, and further drives the frame to move away from the base plate 1.136, thereby facilitating the frame grabbing assembly 1.2 to take and place the frame.

In some implementations, there are two frame loading assemblies 1.1, which are respectively arranged on both sides of the frame grabbing assembly 1.2; therefore, the frame grabbing assembly 1.2 can cyclically pick the frames on the two frame loading assemblies 1.1, thereby providing uninterrupted loading of the frames.

Figure 7:
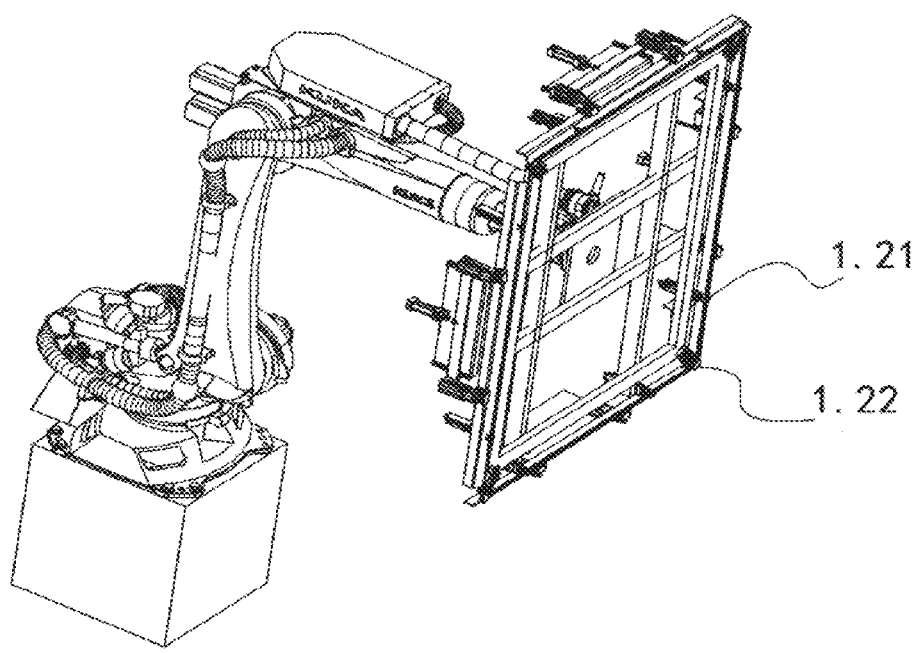
FIG. 7 is a structure schematic diagram of a frame grabbing assembly according to an embodiment of the present invention.
Figure 8:
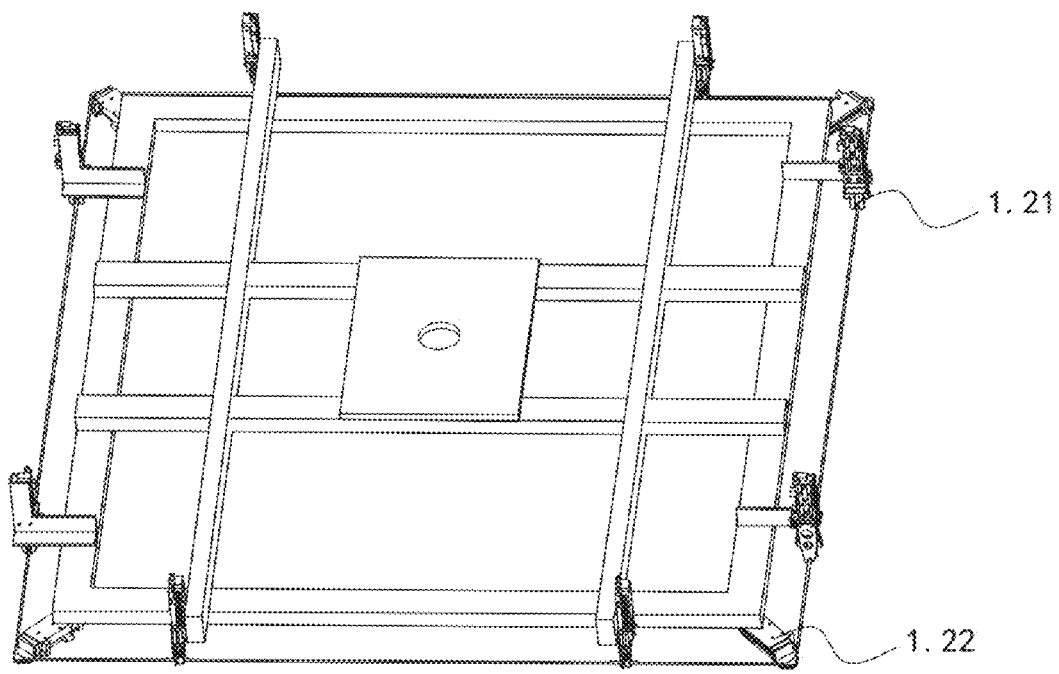
FIG. 8 is a partial structure schematic diagram of a frame grabbing assembly according to an embodiment of the present invention.
Figure 9:
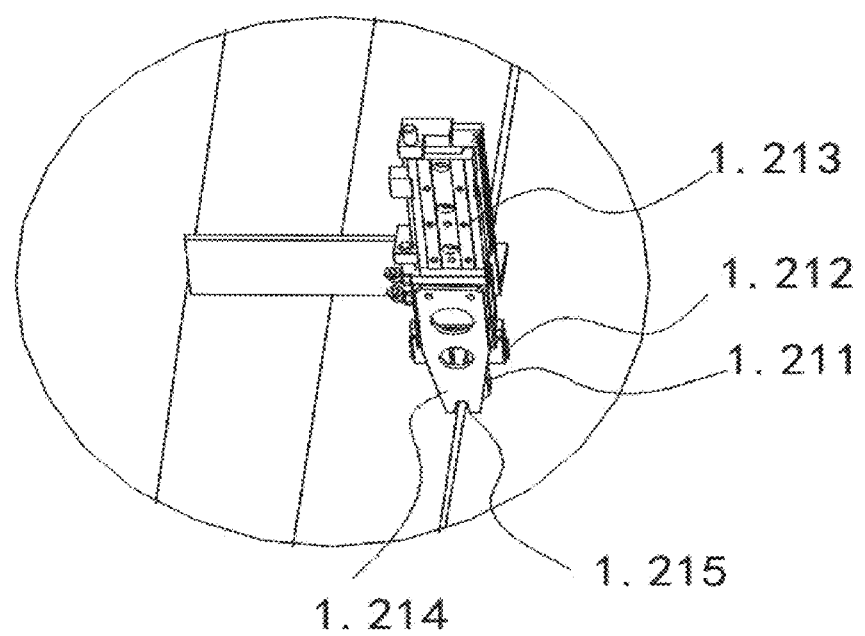
FIG. 9 is an enlarged structure schematic diagram of a clamping module according to an embodiment of the present invention.
Figure 10:
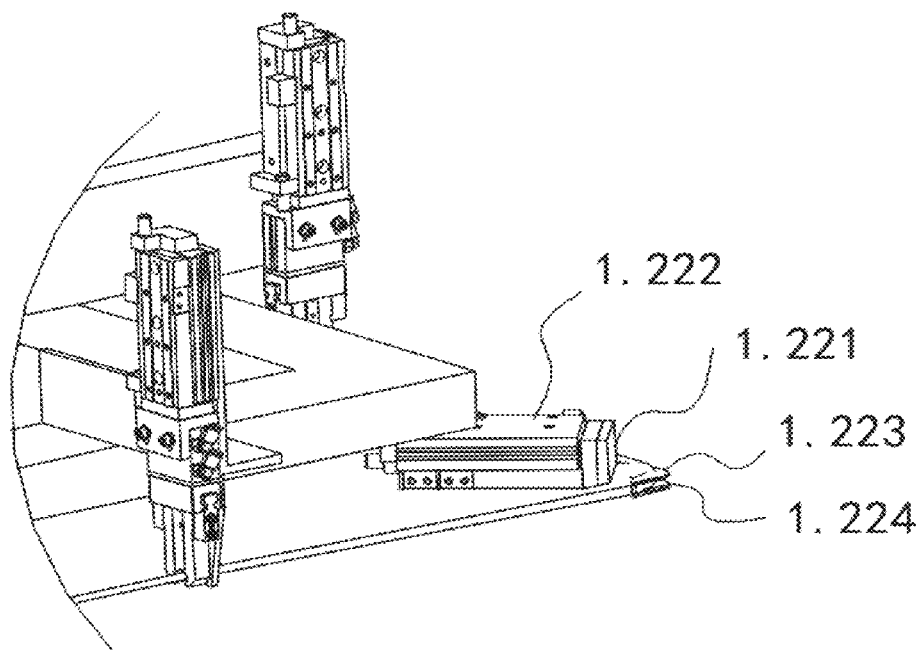
FIG. 10 is an enlarged structure schematic diagram of the inner support module according to an embodiment of the present invention.

As shown in FIG. 7, the frame grabbing assembly 1.2 comprises a clamping module 1.21 and an inner support module 1.22; the clamping module 1.21 is used to clamp the frame and remove it from the bin, and the inner support module 1.22 is used to expand it from the inside of the frame. A mattress spring clamping assembly 1.3, arranged in the area of the mattress spring assembly frame, used for clamping and fixing the mattress spring.

A non-woven fabric folding assembly for mattress spring 1.5, comprising a folding plate 1.51 that can fold the non-woven fabric at the edge of the mattress spring after it is fitted with a frame.

As shown in FIGS. 7-10, in one or more embodiments, the clamping module 1.21 comprises a clamping jaw 1.211, a clamping jaw cylinder 1.212, and a telescopic cylinder 1.213; the clamping jaw cylinder 1.212 drives the clamping jaw 1.211 to grip the frame, and the telescopic cylinder 1.213 drives the clamping jaw 1.211 and the clamping jaw cylinder 1.212 to translate.

The inner support module 1.22 comprises a steel wire support plate 1.221 and a driving cylinder 1.222, wherein the driving cylinder 1.222 is connected to the steel wire support plate 1.221 to drive the steel wire support plate 1.221 to translate; When clamping the frame, the clamping module 1.21 first uses the telescopic cylinder 1.213 to drive the clamping jaw 1.211 to extend and approach the frame, and then the clamping jaw cylinder 1.212 drives the clamping jaw 1.211 to clamp the steel wire part of the frame; The steel wire support plate 1.221 can drive the frame to expand outward under the action of the driving cylinder 1.222, keeping the frame in an expanded state; in this way, the frame can be directly fitted onto the mattress spring without the need for additional devices for expanding the frame.

In one or more embodiments, the head of the steel wire support plate 1.221 is provided with a positioning clamping block 1.223, and a circular arc groove 1.224 is opened on the positioning clamping block 1.223; the bent part of the frame can be clamped in the circular arc groove 1.224.

The circular arc groove 1.224 matches the bent part of the frame, and when the expansion structure expands the frame, the force bearing point is selected at the bent part of the frame.

In one or more embodiments, the clamping module 1.21 also comprises a guide chuck plate 1.214, wherein a slot 1.215 is provided at the bottom of the guide chuck plate 1.214, and the guide chuck plate 1.214 is arranged parallel to the clamping jaw 1.211.

The guide chuck plate 1.214 functions to assist the clamping jaw 1.211 in gripping the frame; when the telescopic cylinder 1.213 drives the clamping jaw 1.211 to extend and approach the frame, the guide chuck plate 1.214 moves synchronously with the clamping jaw 1.211, and the steel wire part of the frame enters the slot 1.215 of the guide chuck plate 1.214; in this case, the clamping module 1.21 and the frame complete the preliminary positioning; in this way, when the clamping jaw 1.211 is gripping the frame, the frame will not move randomly, effectively ensuring that the clamping jaw 1.211 can quickly grip the frame.

Figure 11:
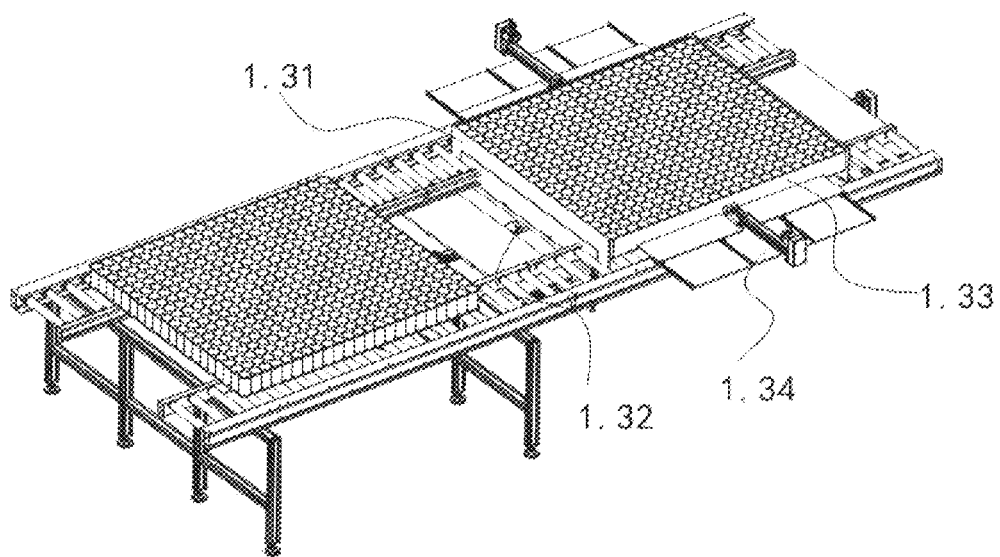
FIG. 11 is a schematic diagram of a mattress spring clamping assembly according to an embodiment of the present invention.
Figure 12:
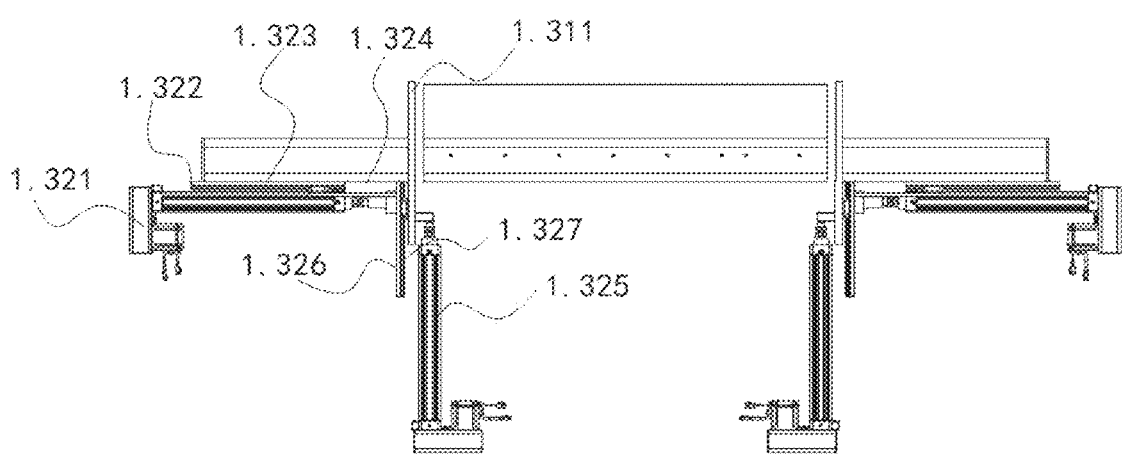
FIG. 12 is a schematic diagram of a positive clamping plate driving mechanism according to an embodiment of the present invention.

As shown in FIGS. 11-12, in one or more embodiments, the mattress spring clamping assembly 1.3 comprises a positive clamping plate module 1.31, a positive clamping plate driving mechanism 1.32, a side clamping block 2.22 module, and a side clamping block 2.22 driving module, wherein:

The positive clamping plate module 1.31 comprises two symmetrical clamping plates arranged on the roller conveyor line to clamp the front and rear sides of the mattress spring;

The positive clamping plate driving mechanism 1.32 drives the two clamping plates in the positive clamping plate module 1.31 to move to clamp the mattress spring or retract to avoid the mattress spring;

The side clamping block module 1.33 comprises two symmetrical clamping blocks arranged on both sides of the roller conveyor line, wherein the two clamping blocks are used to clamp the left and right sides of the mattress spring;

The side clamping block driving module 1.34 drives two clamping blocks in the side clamping block module to move and clamp the mattress spring; With two symmetrical clamping plates and two symmetrical clamping blocks, the mattress spring is clamped from the front, back, left, and right sides, so that the mattress spring is positioned on the roller conveyor line for easy installation of the frame and nailing in the future; The two symmetrical clamping blocks located on the roller conveyor line can be translated and lifted by the positive clamping plate driving mechanism 1.32, so that the clamping blocks can clamp the mattress spring, and descend and retract without blocking the normal movement of the mattress spring on the roller conveyor line.

In one or more embodiments, the positive clamping plate driving mechanism 1.32 comprises a first translation driving device including a first telescopic motor 1.321 with the telescopic end acting on the clamping plate to drive the clamping plate to translate;

The first translation driving device also comprises a first guide plate 1.322, wherein a translation track 1.323 is provided on the first guide plate 1.322, the clamping plate is provided on the movable seat 1.324, and the movable seat 1.324 moves on the translation track 1.323; By use of the first telescopic motor 1.321 to drive the clamping plate to move horizontally, one clamping plate corresponds to one telescopic motor; during the operation, the two clamping plates simultaneously move inward or outward; The translation track 1.323 on the first guide plate 1.322 can play a limiting role in guiding the clamping plate 1.311, keeping it translate in a straight line; The two symmetrical clamping blocks located on the roller conveyor line can be translated and lifted by the positive clamping plate driving mechanism 1.32, so that the clamping blocks can clamp the mattress spring, and descend and retract without blocking the normal movement of the mattress spring on the roller conveyor line.

In one or more embodiments, the positive clamping plate driving mechanism 1.32 also comprises a lifting driving device including a second telescopic motor 1.325 with the telescopic end connected to the clamping plate to drive the clamping plate to lift; The lifting driving device also comprises a second guide plate 1.326, and a lifting track 1.327 is also provided on the second guide plate 1.326; the clamping plate is movable on the lifting track 1.327.

With the second telescopic motor 1.325 to drive the clamping plate for lifting, one clamping plate corresponds to one telescopic motor; when it is necessary to position and fix the mattress spring, the clamping plate is driven by the second telescopic motor 1.325 to extend from below the roller conveyor line; after the mattress spring frame is installed, the second telescopic motor 1.325 drives the clamping plate to descend and retract, so that the next mattress spring will not be blocked when moving; The translation track 1.323 on the second guide plate 1.326 can play a limiting role in guiding the clamping plate, keeping it lift in a straight line.

In one or more embodiments, the side clamping block driving module 1.34 comprises a second translation driving device with the same structure as the first translation driving device.

Figure 13:
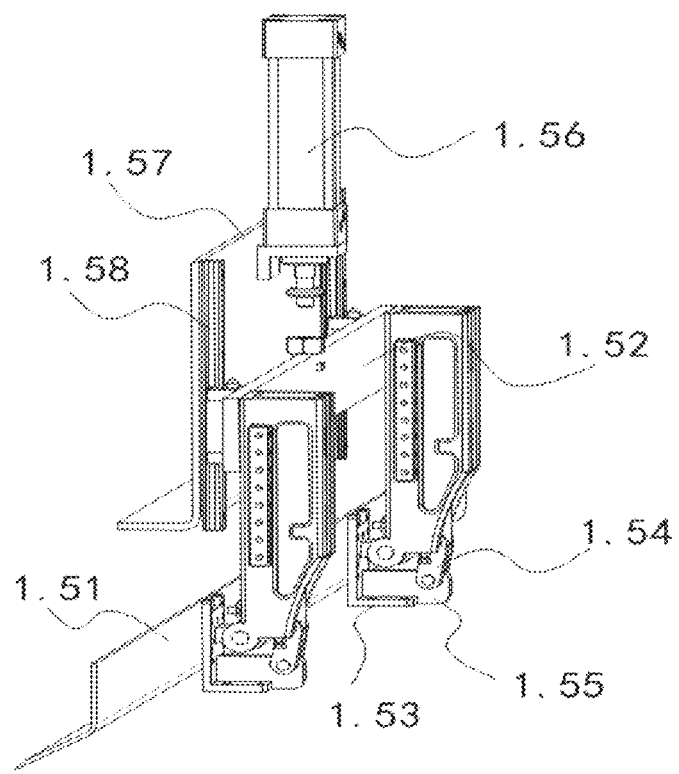
FIG. 13 is a schematic diagram of a non-woven fabric folding structure of mattress spring according to an embodiment of the present invention.
Figure 14:
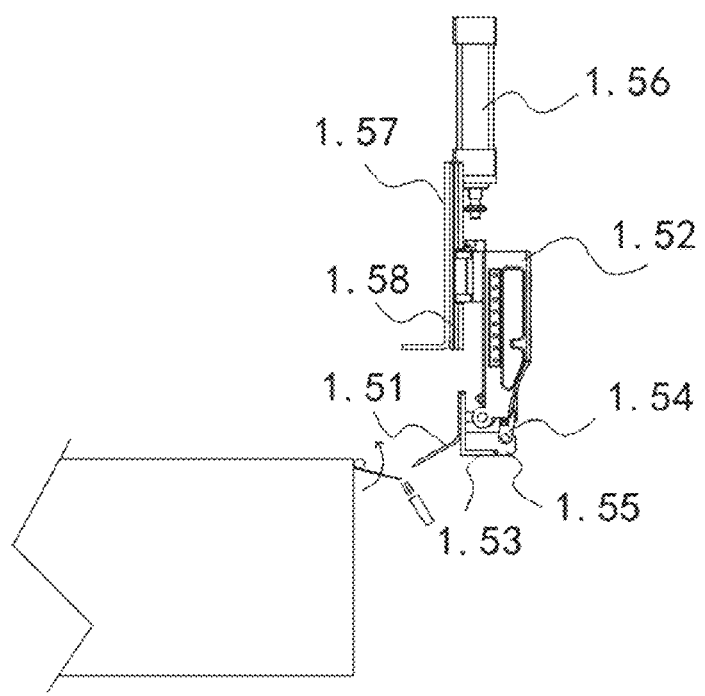
FIG. 14 is a principle schematic diagram of a non-woven fabric folding structure of mattress spring according to an embodiment of the present invention.
Figure 15:
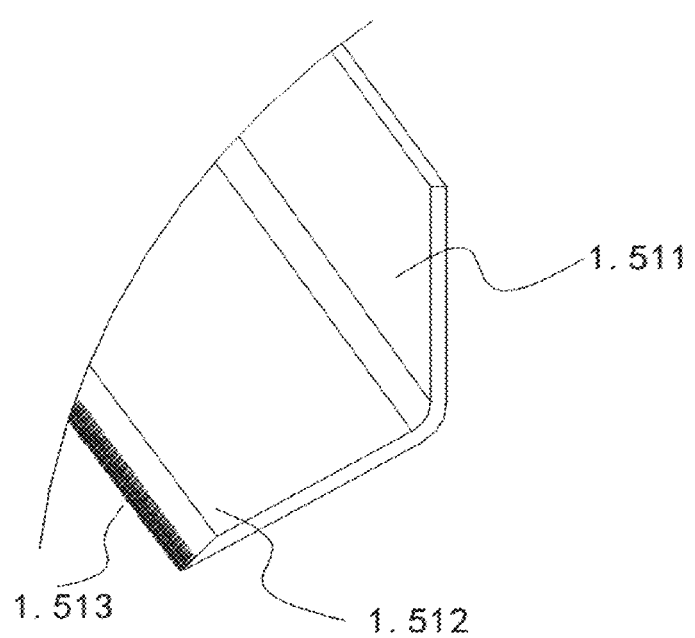
FIG. 15 is an enlarged structure schematic diagram of the folding plate according to an embodiment of the present invention.
Figure 16:
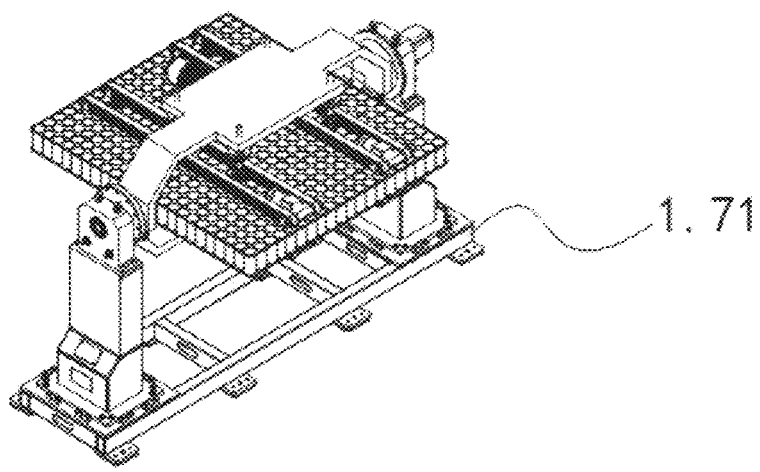
FIG. 16 is a structure schematic diagram of mattress spring flipping device according to an embodiment of the present invention.
Figure 17:
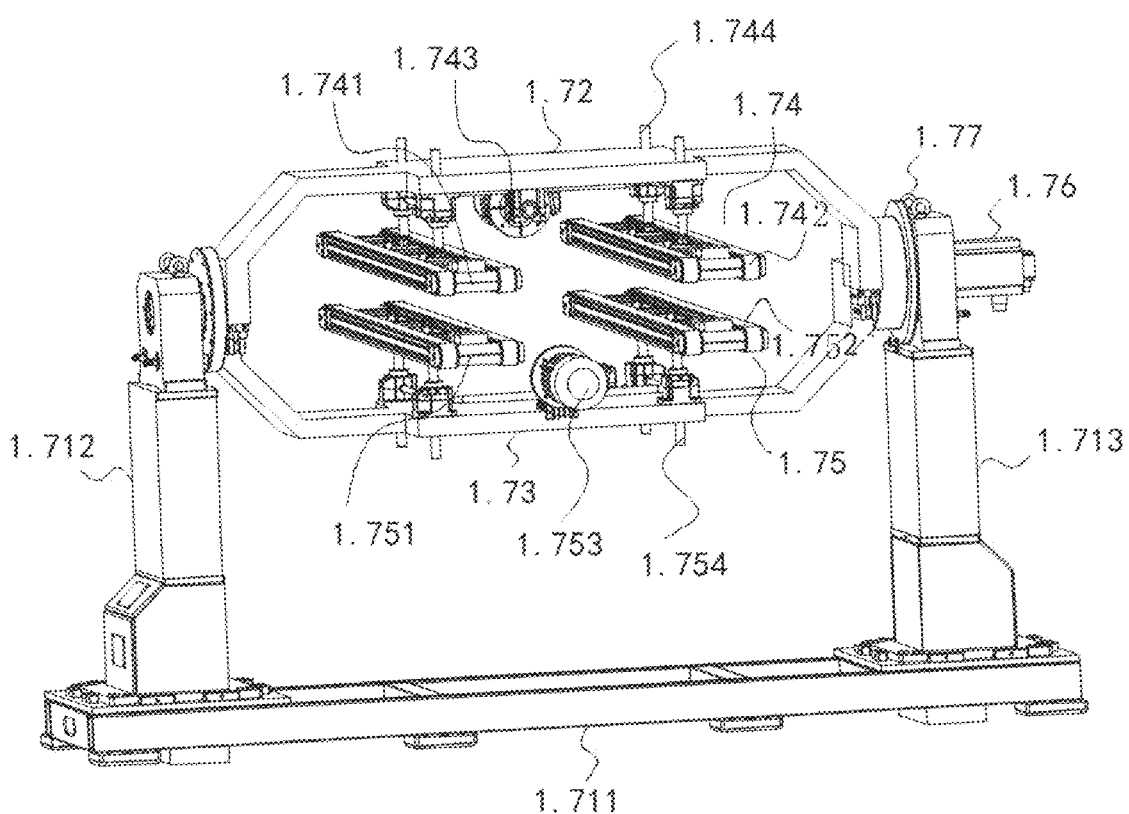
FIG. 17 is a schematic diagram of the flipping mechanism and mattress spring clamping state according to an embodiment of the present invention.

As shown in FIGS. 13 and 14, in one or more embodiments, the folding plate 1.51 is provided with a bend, and the folding plate 1.51 comprises a support plate 1.511 and an edge hook plate 1.512 connected to the support plate 1.511; the edge hook plate 1.512 is not on the same plane as the support plate 1.511, and extends and bends towards the side near the mattress spring to be folded.

The end of the edge hook plate 1.512 is provided with a guide slope, and the end of the guide slope is provided with a serrated surface 1.513; The support plate 1.511 functions to fix the entire folding plate 1.51, so as to facilitate the fixation and installation of the folding plate 1.51 with other parts of the equipment; The guide slope allows the end of the edge hook plate to better act on the non-woven fabric, thereby enabling the edge hook plate 1.512 to drive the non-woven fabric to fold; The serrated surface 1.513 on the end face of the edge hook plate 1.512 can allow the edge hook plate 1.512 to effectively hook the surface of the non-woven fabric, so that the edge hook plate 1.512 drives the non-woven fabric to fold without detachment between the edge hook plate 1.512 and the non-woven fabric.

In one or more embodiments, the non-woven fabric folding assembly for mattress spring 1.5 also comprises a rotating mechanism including a transmission structure; the transmission structure comprises a lifting support 1.52, a transmission plate 1.53, a connecting rod 1.54, and a rod seat 1.55; one end of the connecting rod 1.54 is hinged to the first end of the lifting support 1.52, and the other end of the connecting rod 1.54 is hinged to the rod seat 1.55; the rod seat 1.55 is fixedly arranged on the transmission plate 1.53, and the second end of the lifting support 1.52 is hinged to the transmission plate 1.53; the folding plate 1.51 is fixedly connected to the transmission plate 1.53.

The rotating mechanism also comprises a driving structure including a lifting driving cylinder 1.56 that can drive the lifting support 1.52 to lift and lower; The driving structure also comprises a base 1.57, on which a linear lifting track 1.58 is provided, and the lifting support 1.52 is movable on the linear lifting track 1.58 with the help of a slider; When the lifting support 1.52 is lifted up and down under the action of the driving device, it drives the connecting rod 1.54 that drives the rod seat 1.55; under the action of the connecting rod 1.54 mechanism, the linear driving force of the lifting support 1.52 can be converted into the rotational force of the transmission plate 1.53, so that the transmission plate 1.53 drives the folding plate 1.51 to flip and the folding plate 1.51 drives the non-woven fabric edge of the mattress spring to flip; The lifting cylinder can drive the lifting support 1.52 to go up and down; The linear lifting track 1.58 can guide the lifting support 1.52, allowing the lifting support 1.52 to move up and down within the range of the linear lifting track 1.58.

As shown in FIG. 14, usually a circle of excess non-woven fabric is reserved at the edge of the mattress spring; by using the folding plate 1.51 of this application, moving it below the non-woven fabric, rotating the folding plate 1.51 and lifting up the edge of the non-woven fabric, the non-woven fabric is wrapped around the frame to produce the effect of covering the frame.

In one or more embodiments, the mattress spring frame assembly mechanism 1 also comprises a nailing assembly that is arranged above the roller conveyor line and corresponds to the positioning mechanism, for nailing and fixing at the position of non-woven fabric wrapped around the frame of the mattress spring.

The nailing assembly comprises several nail guns arranged above the roller conveyor line, each nail gun being connected to a three-axis driving module; the three-axis driving module can drive the nail gun to move and fix the nails at the position of non-woven fabric wrapped around the frame of the mattress spring.

In one or more embodiments, it also comprises a mattress spring front frame installation station and a mattress spring back frame installation station, and the structures of the two installation stations are the same; a mattress spring flipping device 1.7 is arranged between the two installation stations, which is used to flip the mattress spring 180 degrees.

The mattress spring flipping device 1.7 also comprises a mounting base 1.71 and a first flip bracket 1.72, wherein the first flip bracket 1.72 is rotatably arranged on the mounting base 1.71; It also comprises a second flip bracket 1.73, wherein the second flipping bracket 1.73 is rotatably arranged on the mounting base 1.71, and the first flip bracket 1.72 and the second flip bracket 1.73 correspond vertically to each other and are synchronously flipped; It also comprises a first fixture assembly 1.74 located on the inner side of the first flip bracket 1.72 and movable back and forth along the direction of the first flip bracket 1.72; It also comprises a second fixture assembly 1.75 located on the inner side of the second flip bracket 1.73 and movable back and forth along the direction of the second flip bracket 1.73.

By control of the relative movement of the first fixture assembly 1.74 and the second fixture assembly 1.75, the mattress spring is clamped; then, with the help of the synchronous flipping of the first flip bracket 1.72 and the second flip bracket 1.73, the mattress spring clamped by the two fixture assemblies is flipped together, providing a 180° automatic flipping of the mattress spring without manual flipping, with high efficiency and no change in position.

The first fixture assembly 1.74 comprises a first clamping seat 1.741 for clamping the mattress spring, wherein a first synchronous belt 1.742 capable of automatic transmission is provided on the first clamping seat 1.741, the first clamping seat 1.741 is fixed at the lower end of the first guide column 1.744, and the first guide column 1.744 is connected to the first motor 1.743 for transmission; The second fixture assembly 1.75 comprises a second clamping seat 1.751 for clamping the mattress spring, wherein a second synchronous belt 1.752 capable of automatic transmission is provided on the second clamping seat 1.751, the second clamping seat 1.751 is fixed at the lower end of the second guide column 1.754, and the second guide column 1.754 is connected to the second motor 1.753 for transmission.

By use of the fixture assemblies to flip the mattress spring, the incoming material docking and non-offset conveying of the mattress spring are also completed through synchronous belts, with a high conveying accuracy, making it easy to dock with the processing equipment and improving the production and processing efficiency.

There are two first clamping seats 1.741, each of which is connected to two first guide columns 1.744; the two first clamping seats 1.741 move up and down synchronously through the first motor 1.743; There are two second clamping seats 1.751, each of which is connected to two second guide columns 1.754; the two second clamping seats 1.751 move up and down synchronously through the second motor 1.753.

Two clamping seats are arranged above and below the mattress spring to improve the stability of clamping the mattress spring by the clamping seats; Two guide columns are arranged on each clamping seat to maintain the clamping force and stability of the clamping seat on the mattress spring.

The mounting base 4.451 comprises a bottom plate and left support 1.712 and right support 1.713 arranged at both ends of the bottom plate; the first flip bracket 1.72 and the second flip bracket 1.73 are both arranged between the left support 1.712 and right support 1.713.

The left support 1.712 and right support 1.713 are arranged at both ends of the bottom plate, and two flip brackets are arranged between the left and right supports to provide a sturdy and stable structure, thereby maintaining the structural stability of the mattress spring during the flipping.

The left end of the first flip bracket 1.72 and the left end of the second flip bracket 1.73 are both rotatably arranged on the left support 1.712, and the right end of the first flip bracket 1.72 and the right end of the second flip bracket 1.73 are both rotatably arranged on the right support 1.713.

The two ends of the first flip bracket 1.72 and the two ends of the second flip bracket 1.73 are correspondingly arranged on the supports on the left and right sides, respectively, to facilitate the synchronous installation of the flipping structure and the arrangement of the power system.

The first flip bracket 1.72 and the second flip bracket 1.73 are both connected to a third motor 1.76 for transmission.

The two flip brackets are rotated by a third motor 1.76 to automatically flip, with a high efficiency.

The left end of the first flip bracket 1.72 is fixedly connected to the left end of the second flip bracket 1.73, and the right end of the first flip bracket 1.72 is fixedly connected to the right end of the second flip bracket 1.73.

The ends of the first flip bracket 1.72 and second flip bracket 1.73 on the same side are fixedly connected to facilitate overall installation and maintain the stability of the overall structure.

The left and right ends of the mounting base 1.71 are equipped with lifting lugs 1.77.

The lifting lugs 1.77 are arranged at both ends of the mounting base 1.71, which can be used to lift the entire mechanism for easy handling and transfer.

In one or more embodiments, the rack 2.11 is arranged on the turntable 2.12 and evenly distributed around the turntable 2.12, with butterfly springs stacked on the rack 2.11.

The turntable 2.12 can be driven by the motor to rotate, and the rack 2.11 on the turntable 2.12 changes its position with the turntable 2.12; the butterfly springs are stacked on each rack 2.11 to provide uninterrupted loading; the clamping module 1.21 removes the butterfly springs stacked on the rack 2.11 to provide automatic loading; when the butterfly springs on one rack 2.11 are completely removed, the turntable 2.12 can rotate to move another full rack 2.11 to the picking area of the clamping module 1.21.

In one or more embodiments, one side of the turntable 2.12 is provided with a dual-axis clamping module 2.13 and a buffer rack 2.14; the buffer rack 2.14 is provided with several positioning slots arranged in a straight line, and the butterfly springs are placed in the positioning slots.

A buffer area is arranged on one side of the turntable 2.12 rack 2.11; the butterfly springs on the rack 2.11 are first removed by the dual-axis clamping module 1.21 and placed on the buffer rack 2.14 in the buffer area; the buffer rack 2.14 is provided with several positioning slots arranged in a straight line, and one butterfly spring is placed in each positioning slot; when a row of positioning slots is filled with butterfly springs, the clamping robot 2.23 can remove all the butterfly springs on the buffer rack 2.14 at once, which can improve the efficiency of picking; in the meantime, the row of removed butterfly springs can be nailed to the side of the mattress spring at once; The dual-axis clamping module 2.13 comprises a clamping jaw and a dual-axis driving module; the dual-axis driving module can drive the clamping jaw to translate and lift, so that the clamping jaw can remove the butterfly spring from the rack 2.11 and place it on the buffer rack 2.14.

Figure 18:
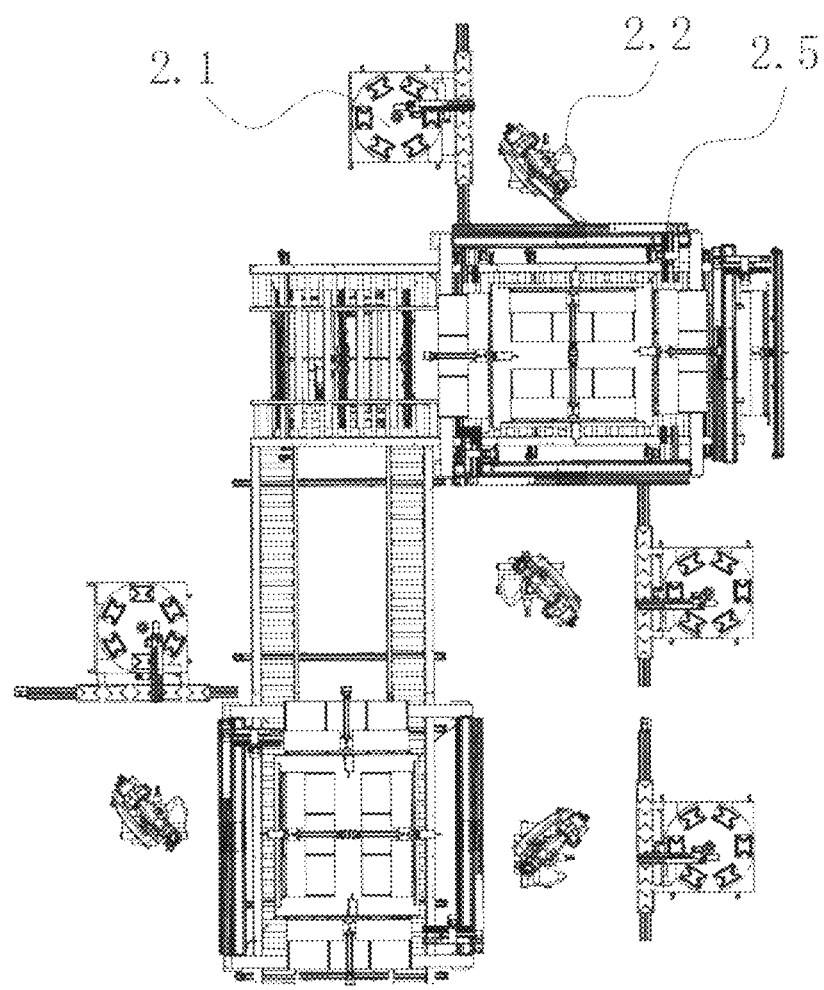
FIG. 18 is a structure schematic diagram of a mattress spring butterfly spring nailing mechanism according to an embodiment of the present invention.
Figure 19:
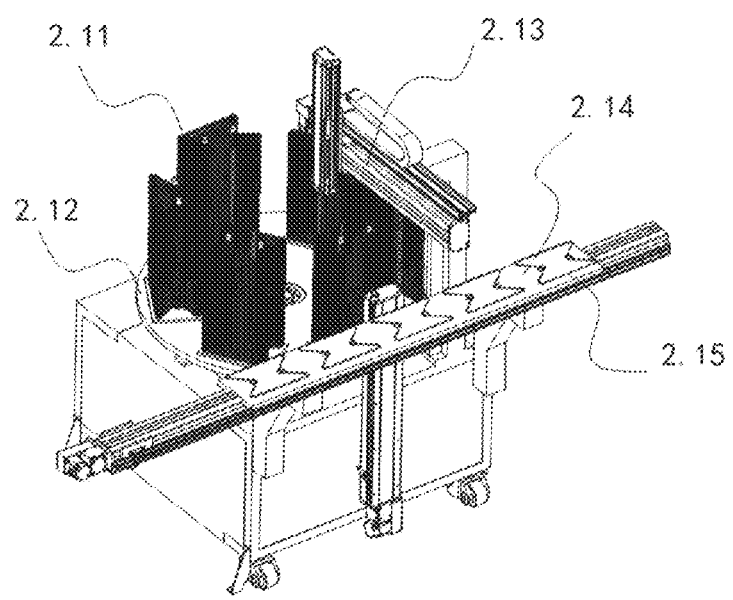
FIG. 19 is a schematic diagram of a butterfly spring loading assembly according to an embodiment of the present invention.

As shown in FIGS. 18-19, the mattress spring butterfly spring nailing mechanism 2 is used to install butterfly springs on the side of the mattress spring, which comprises a butterfly spring loading assembly 2.1 including a rack 2.11 for placing butterfly springs; A butterfly spring clamping assembly 2.2, comprising a clamping robot 2.23 for gripping butterfly springs and placing them on the side of the mattress spring; A mattress spring positioning and lifting assembly 4.4, arranged in the area where the butterfly spring is assembled on the mattress spring, used to lift the mattress spring from the roller conveyor line and clamp and fix; A butterfly spring nailing assembly 2.5, arranged in the area where the butterfly spring is assembled on the mattress spring, used for nailing on the side of the mattress spring to fix the butterfly spring on the side of the mattress spring.

Figure 20:
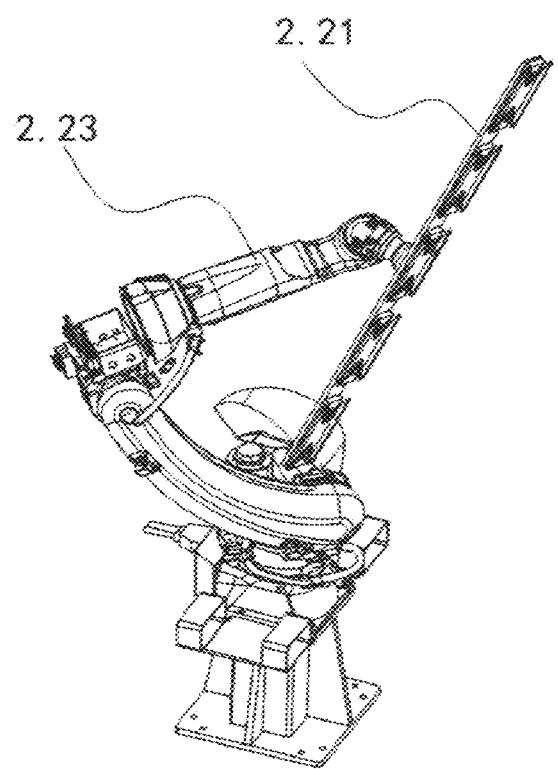
FIG. 20 is a structure schematic diagram of a clamping robot according to an embodiment of the present invention.
Figure 21:
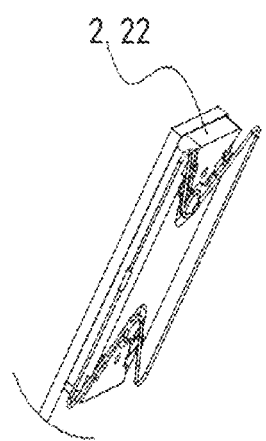
FIG. 21 is a schematic diagram of the front-end clamping block structure of a clamping robot according to an embodiment of the present invention.

As shown in FIGS. 20-21, in one or more embodiments, the picking end of the clamping robot 2.23 comprises a mounting plate 2.21, on which several clamping blocks 2.22 arranged in a straight line are provided; the clamping blocks 2.22 are correspondingly arranged with the positioning slots 2.15 on the buffer rack 2.14, and one clamping block 2.22 corresponds to a butterfly spring for clamping.

When the clamping robot 2.23 picks materials from the buffer rack 2.14, the clamping blocks 2.22 on the mounting plate 2.21 can remove the butterfly springs from the positioning slots 2.15; each clamping block 2.22 corresponds to the butterfly spring being removed from one positioning slot 2.15; the linearly arranged clamping blocks 2.22 can remove a row of butterfly springs at once and directly attach them to the side of the mattress spring; then, the nailing mechanism nails this row of butterfly springs to the side of the mattress spring in sequence.

Figure 22:
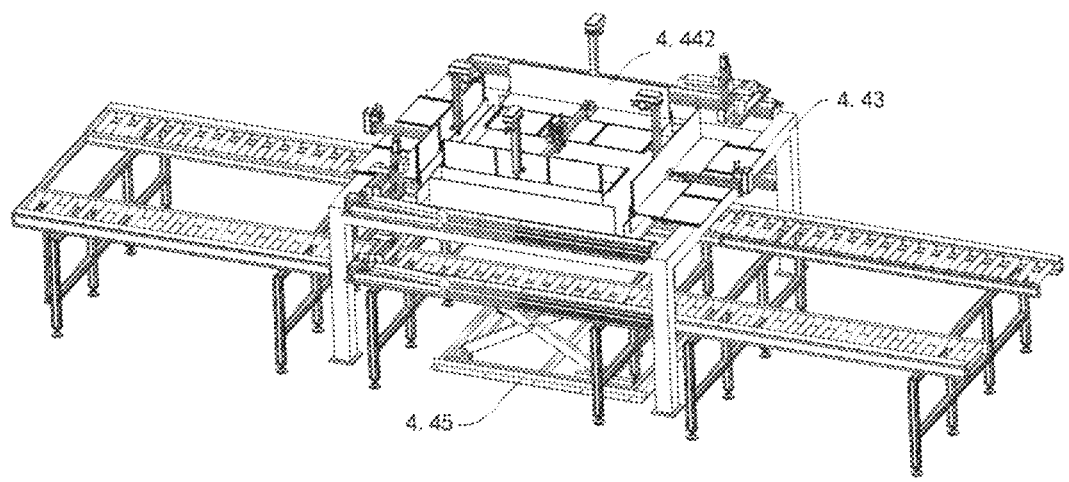
FIG. 22 is a schematic diagram of a mattress spring positioning and lifting mechanism according to an embodiment of the present invention.
Figure 23:
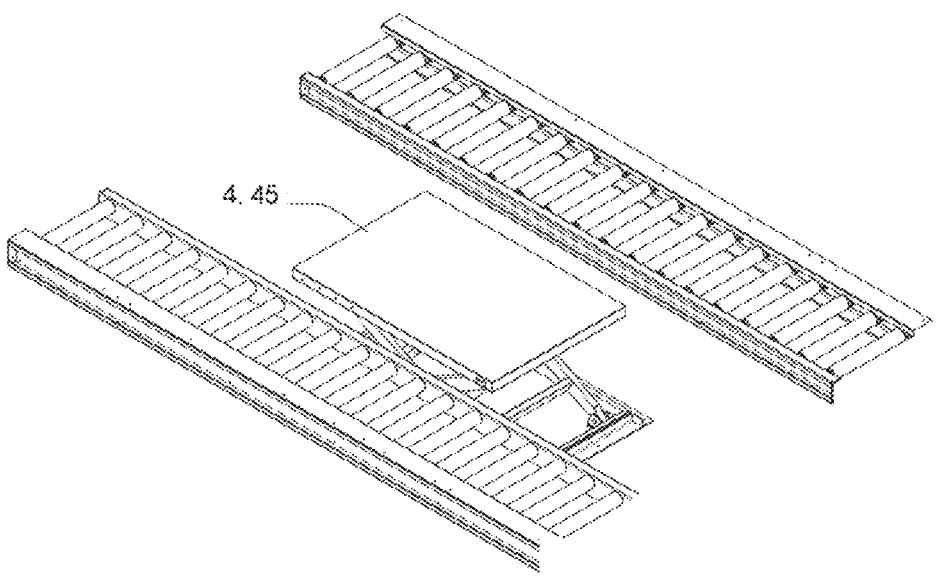
FIG. 23 shows the positional relationship between the conveying component and the lifting component in an embodiment of the present invention.
Figure 24:
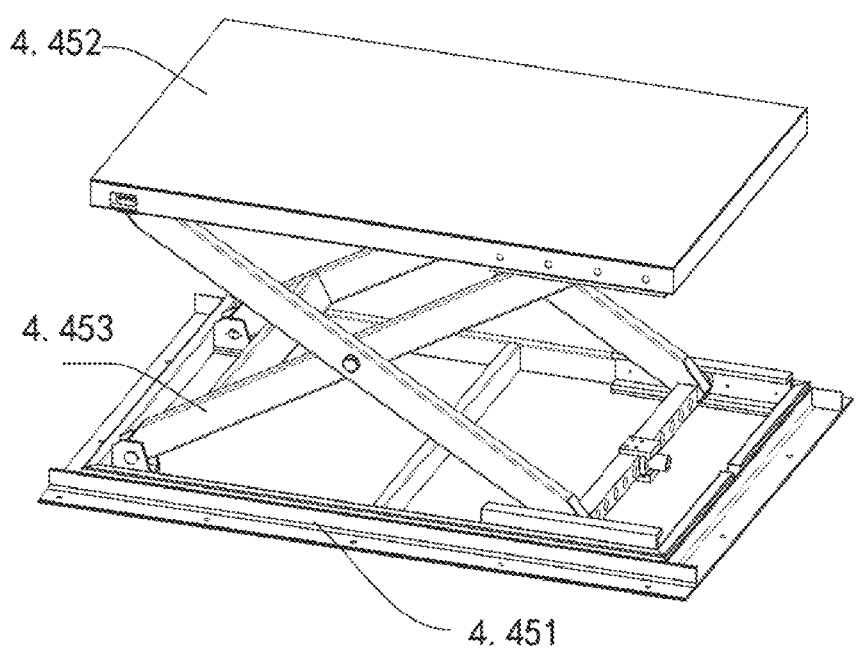
FIG. 24 is a structure schematic diagram of a lifting component according to an embodiment of the present invention.
Figure 25:
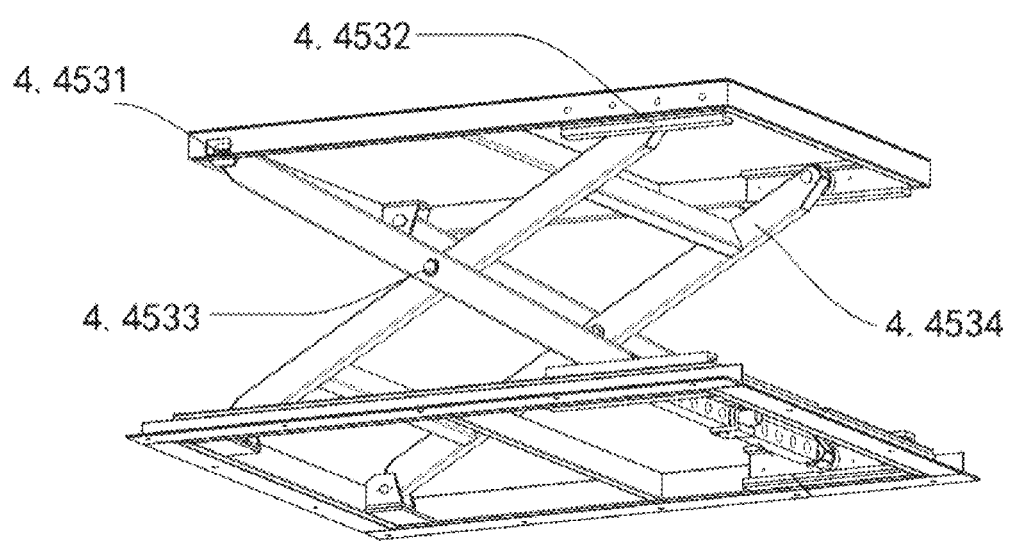
FIG. 25 is a schematic diagram of a lifting component from another perspective according to an embodiment of the present invention.
Figure 26:
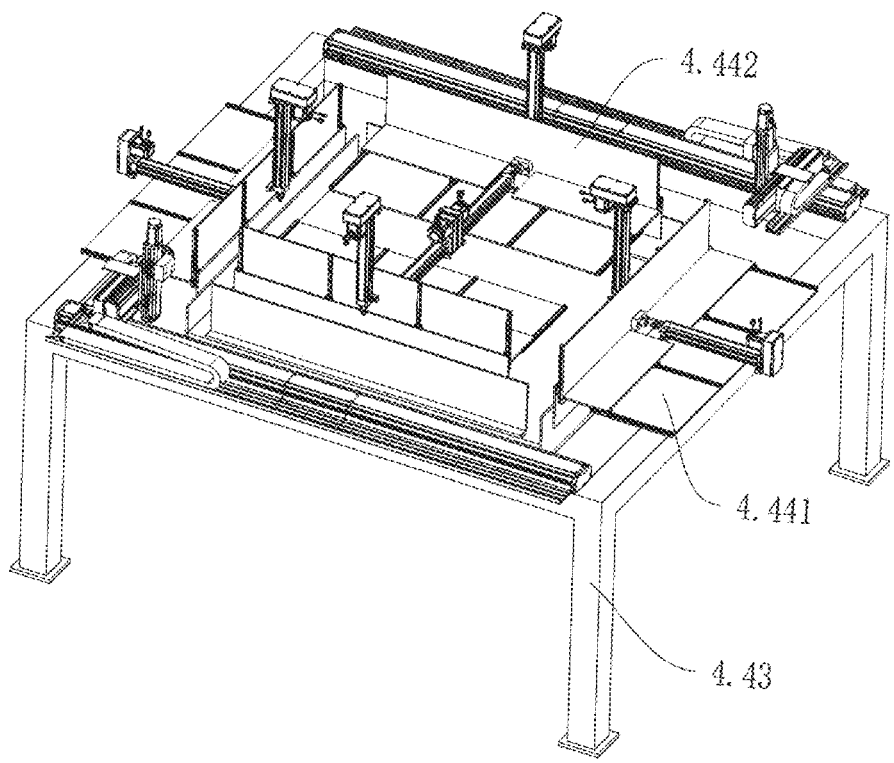
FIG. 26 shows the positional relationship between the truss and the positioning component in an embodiment of the present invention.
Figure 27:
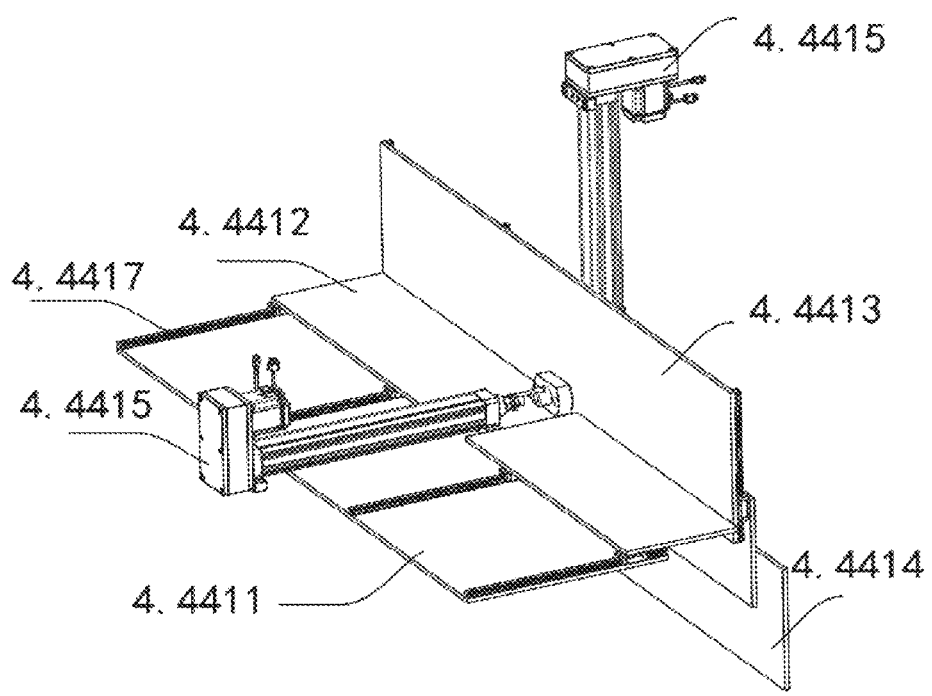
FIG. 27 is a structure schematic diagram of the first positioning mold according to an embodiment of the present invention.
Figure 28:
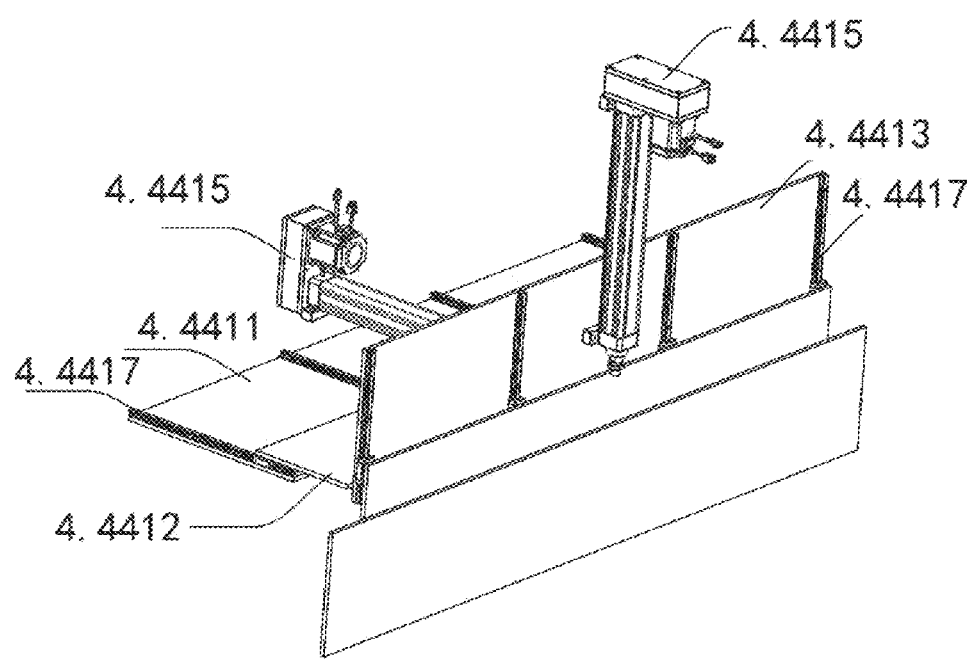
FIG. 28 is a schematic diagram of the first positioning mold from another perspective according to an embodiment of the present invention.
Figure 29:
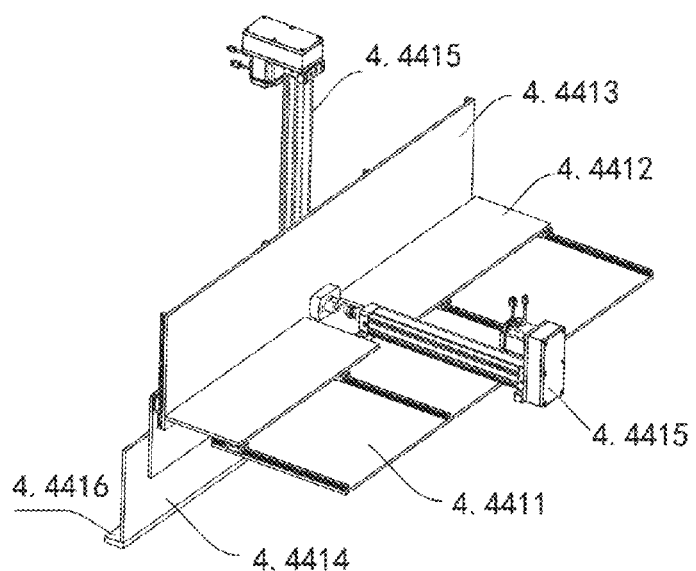
FIG. 29 is a structure schematic diagram of the second positioning mold according to an embodiment of the present invention.
Figure 30:
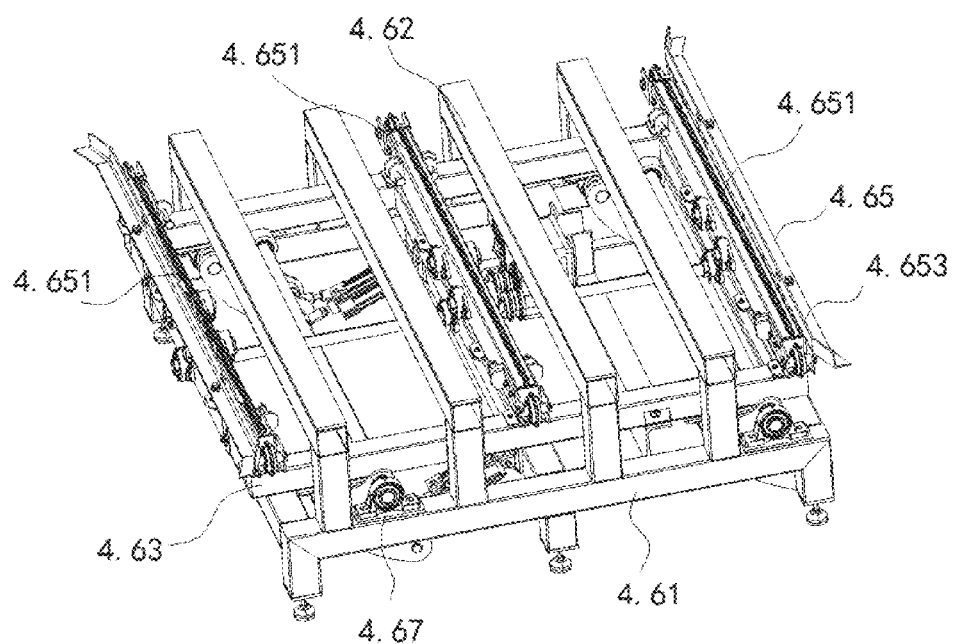
FIG. 30 is a structure schematic diagram of a lifting and transferring mechanism according to an embodiment of the present invention.
Figure 31:
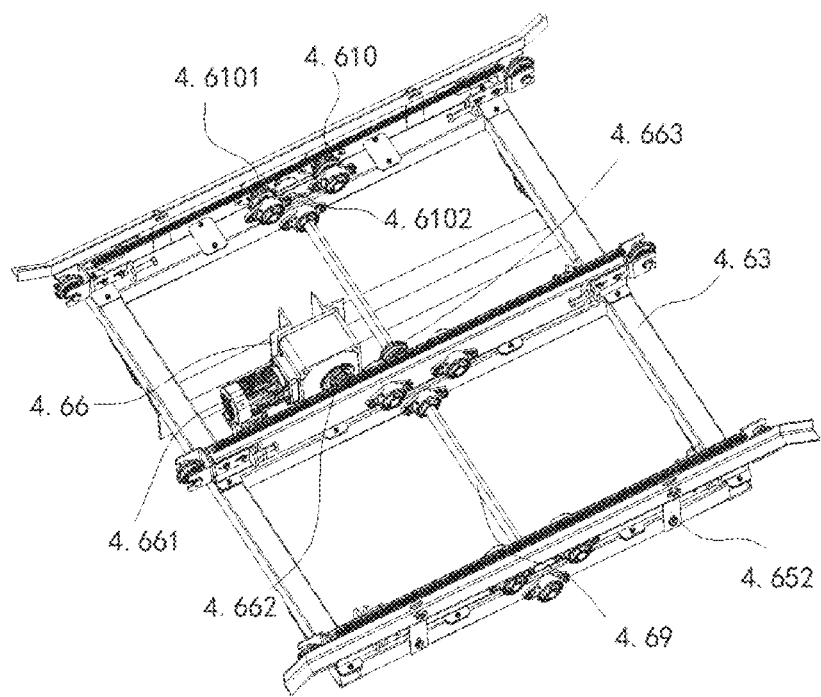
FIG. 31 is a partial structural axial view of a lifting and transferring mechanism according to an embodiment of the present invention.
Figure 32:
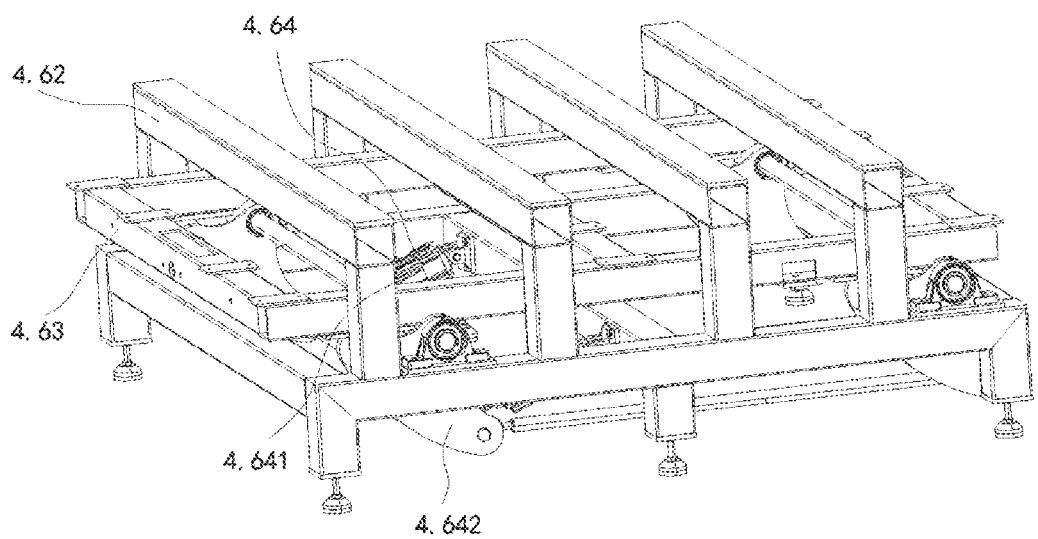
FIG. 32 is a structure schematic diagram of a lifting assembly according to an embodiment of the present invention.
Figure 33:
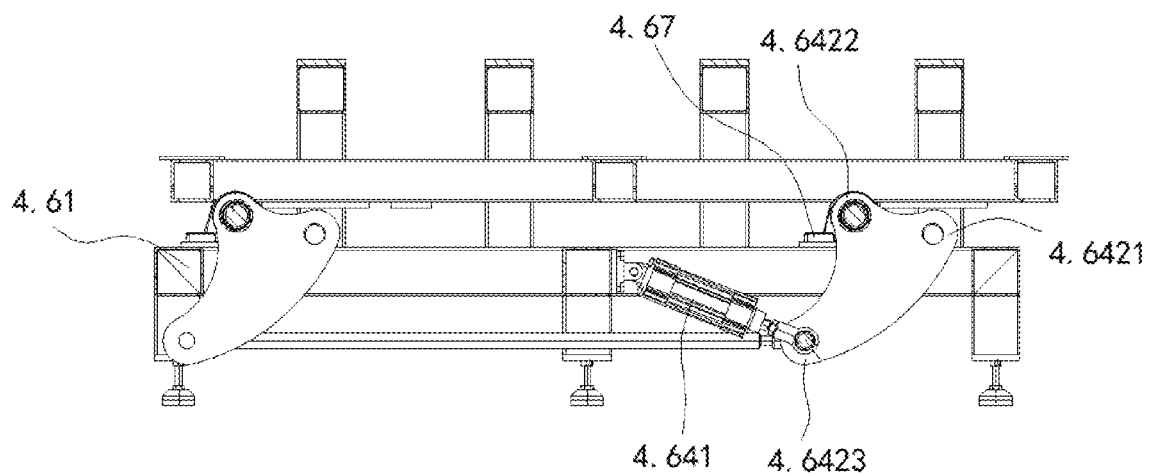
FIG. 33 is a schematic cross-sectional view of a lifting assembly according to an embodiment of the present invention.

As shown in FIGS. 22-24, in one or more embodiments, the mattress spring positioning and lifting assembly 4.4 comprises a positioning module and a lifting module; the lifting module is arranged below the positioning module and can pass through the roller conveyor line to lift the mattress spring from the roller conveyor line and reach the positioning module; the positioning module can position and fix the mattress spring.

When nailing the side of the mattress spring with butterfly springs, the bottom of the mattress spring is located on the roller conveyor line, which is not convenient for the operation of the nailing robot, and it is also necessary to maintain the stability of the mattress spring position during the nailing process; Therefore, a lifting component 4.45 below the mattress spring can lift the mattress spring to a suitable position for nailing, avoiding collision with the conveying component during the nailing and improving the processing efficiency; And a positioning component 4.44 is arranged above the mattress spring, it plays a role in fixing the mattress spring when nailing the side of the mattress spring, avoiding nailing misalignment and further maintaining the stability of the mattress spring position.

As shown in FIGS. 25-29, in one or more embodiments, the positioning module comprises a first clamping portion 4.441 and a second clamping portion 4.442, wherein the first clamping portion 4.441 is arranged along the X direction and the second clamping portion 4.442 is arranged along the Y direction.

The first clamping portion 4.441 and the second clamping portion 4.442 are both capable of relative or opposite movement to adjust the clamping positioning of the mattress spring; Two clamping portions move in two directions while clamping and fixing the four sides of the mattress spring.

In one or more embodiments, both the first clamping portion 4.441 and the second clamping portion 4.442 comprise a first bottom plate 4.4411 and a first push plate 4.4412, wherein the first bottom plate 4.4411 is fixed on the truss 4.43, and the first push plate 4.4412 is connected to the first bottom plate 4.4411 through a sliding rail 4.4417; they also comprise a first telescopic cylinder 4.4415 with one end connected to the first push plate 4.4412 and the other end fixed on the truss 4.43; the first telescopic cylinder 4.4415 can push the first push plate 4.4412 to move relative to the first bottom plate 4.4411;

The first clamping portion 4.441 and the second clamping portion 4.442 also comprise a second bottom plate 4.4413 and a second push plate 4.4414; the second bottom plate 4.4413 is fixed at the end of the first bottom plate 4.4411, and the second push plate 4.4414 is connected to the second bottom plate 4.4413 through a sliding rail 4.4417; they also comprise a second telescopic cylinder, one end of which is connected to the second push plate 4.4414 and the other end is fixed to the second bottom plate 4.4413; the second telescopic cylinder can push the second push plate 4.4414 to move relative to the second bottom plate 4.4413.

In one or more embodiments, the lifting module comprises a base 4.451, a lifting plate 4.452, and a scissor fork assembly 4.453, wherein one side of the scissor fork assembly 4.453 is a fixed end 4.4531 and the other side is a sliding end 4.4532.

The scissor fork assembly 4.453 is symmetrically arranged on both sides, providing support and balance for the mattress spring and improving the stability of mattress spring during the processing; The upper and lower ends of the fixed end 4.4531 are hinged to the lifting plate 4.452 and the base 4.451 through hinged supports, respectively; the upper and lower ends of the sliding end 4.4532 are respectively provided with upper and lower sliding guide devices; The upper sliding guide device and the lower sliding guide device are also provided with a limit function to ensure that after lifting, the mattress spring will not slide at the upper and lower sliding ends during the nailing process, and will be lifted stably; The scissor fork assembly 4.453 comprises two cross-connected lifting rods 4.4534 that are rotatably connected by a pin shaft 4.4533; It can maintain the stability during the lifting process, stably supporting the lifting frame above the support and maintaining the stability of the mattress spring processing above.

In one or more embodiments, the roller conveyor line comprises a first roller conveyor line and a second roller conveyor line; the conveying direction of the first roller conveyor line is perpendicular to that of the second roller conveyor line; the end of the first roller conveyor line is connected to the head of the second roller conveyor line, and a lifting and transferring mechanism 4.6 is provided at the connection point between the two.

In the entire workflow, it is necessary to nail butterfly springs on all four sides of the mattress spring; the mattress spring needs to be nailed with butterfly springs on its left and right sides on the first roller conveyor line, and transferred from the first roller conveyor line to the second roller conveyor line through a lifting and transferring mechanism 4.6; the butterfly springs need to be nailed on the front and rear sides of the mattress spring on the second roller conveyor line to complete the work of nailing butterfly springs on all four sides of the mattress spring.

As shown in FIGS. 30-33, in one or more embodiments, the lifting and transferring mechanism 4.6 comprises a mattress spring support frame 4.62, and a lifting bracket 4.63 that can be lifted and lowered is provided below the mattress spring support frame 4.62; a conveying module 4.65 is provided on the lifting bracket 4.63, and the conveying direction of the conveying module 4.65 is perpendicular to the direction in which the mattress spring moves to the mattress spring support frame 4.62; when the lifting bracket 4.63 rises to contact the mattress spring, the conveying module 4.65 can move the mattress spring from the first roller conveyor line to the second roller conveyor line.

Before the mattress spring is transferred to the mattress spring support frame 4.62, the conveying module 4.65 on the lifting bracket 4.63 is lower than the mattress spring support frame 4.62; After the mattress spring is transferred to the mattress spring support frame 4.62, the lifting bracket 4.63 moves upward, driving the conveying module 4.65 to come into contact with the mattress spring. Now, the conveying module 4.65 starts working to transfer the mattress spring to the next station.

In one or more embodiments, it also comprises a telescopic driving assembly 4.641 and a lifting assembly 4.64 arranged on the framework 4.61, wherein the lifting assembly 4.64 comprises a lifting rotary frame 4.642 hinged to the framework 4.61 and the lifting bracket 4.63, and the telescopic driving assembly 4.641 can drive the lifting rotary frame 4.642 to rotate around the hinge point formed with the framework 4.61 to lift and lower the lifting bracket 4.63.

The telescopic driving assembly provides power for the lifting of the lifting bracket 4.63, which can meet the needs of moving the mattress spring from the previous station to the mattress spring support frame 4.62, avoiding interference during the process of moving the mattress spring to the mattress spring support frame 4.62. The telescopic driving assembly 4.641 can be a telescopic cylinder 1.213 or other known mechanical mechanism that can drive the lifting rotary frame 4.642 to rotate, which is a prior art and will not be further described here.

In one or more embodiments, the lifting rotary frame 4.642 comprises a first hinged end 4.6421, a second hinged end 4.6422, and a third hinged end 4.6423, wherein the first hinged end 4.6421 is hinged on the lower surface of the lifting bracket 4.63, the second hinged end 4.6422 is hinged on the framework 4.61, and the third hinged end 4.6423 is hinged to the telescopic driving assembly 4.641; The number of lifting rotary frames 4.642 in a set of lifting assembly 4.64 is not limited, which may be 1, 2, or more.

During the lifting process, two sets of lifting assemblies 4.64 can cause the lifting bracket 4.63 to lift more smoothly, avoiding the phenomenon of tilting during the lifting and ensuring that the mattress spring can move steadily to the next station. Both hinged end 1 and hinged end 2 can be hinged by the bearing bracket 4.67.

In one or more embodiments, the conveying module 4.65 is connected to the lifting bracket 4.63 through a conveying bracket 4.652, and the conveying module 4.65 comprises a conveyor chain 4.651 arranged around the conveying bracket 4.652.

The conveying bracket 4.652 is adjustable in height through its vertical plate and lifting bracket 4.63 to meet different types of mattress spring requirements. The conveying bracket 4.652 is also provided with a striker plate 4.653 parallel to the conveyor chain 4.651, maintaining the precise position of the mattress spring when transferred to the next station.

In one or more embodiments, it also comprises several driven gear sets 4.610 corresponding to the conveying module 4.65; the driven gear set 4.610 comprises upper and lower gears 4.6101 and 4.6102 arranged in a staggered manner; the upper gear 4.6101 is arranged on the conveying bracket 4.652, and the lower gear 4.6102 is correspondingly arranged on the lifting bracket 4.63; the lifting bracket 4.63 is provided with a driving connecting rod 4.69 along its length, and the driving connecting rod 4.69 sequentially passes through the lower gear 4.6102 and is connected to its bearing; the upper gear 4.6101 and the lower gear 4.6102 can be used for the conveyor chain 4.651 to pass through and mesh with them.

The lower gear 4.6102 rotates to drive the rotation of the conveyor chain 4.651, and the two upper gears 4.6101 can also assist in driving the movement of the conveyor chain 4.651 under the rotation of the lower gear 4.6102. Therefore, the conveyor chain 4.651 can transfer the mattress spring to the next station.

In one or more embodiments, it also comprises a conveyor driving assembly 4.66 that comprises a driving motor 4.661 arranged on the lifting bracket 4.63 and a driving main gear 4.662 and a driving slave gear 4.663 that mesh with each other.

In one or more embodiments, the driving connecting rod 4.69 goes through the driving slave gear 4.663 and is connected to its bearing; The linkage between multiple conveying modules 4.65 is provided by use of the driving connecting rod 4.69 to provide multiple conveying forces for the movement of the mattress spring, thereby improving the mattress spring's conveying efficiency.

In the entire lifting and transferring mechanism 4.6, the mattress spring support frame 4.62, lifting assembly 4.64 and conveying module 4.65 cooperate with each other; the mattress spring support frame 4.62 provides support for the placement of the mattress spring at the lifting and transfer location; the initial movement directions of the conveying module 4.65 and the mattress spring are arranged at a 90-degree angle, which completes the 90-degree track change of the mattress spring, so that the two sides of the mattress spring that have not completed the installation of the butterfly spring's staple bolt are in the direction of the mattress spring transfer, facilitating the complete staple bolting of the butterfly spring on the mattress spring; the lifting assembly 4.64 can effectively avoid interference of the conveying module 4.65 during the mattress spring transfer process.

The above embodiments are only intended to describe the technical concept and characteristics of the present invention, with the aim to enable those familiar with this technology to understand the content of the present invention and implement it, which cannot limit the scope of protection of the present invention; any equivalent changes or modifications made according to the spirit of the present invention shall be covered by the scope of protection of the present invention.

The invention claimed is:

1. An automatic assembly line for mattress springs, comprising:
    a mattress spring conveying mechanism, used for conveying the mattress springs, comprising a roller conveyor line;
    a mattress spring frame assembly mechanism, used for installing frames on the mattress springs, comprising:
        at least one frame loading assembly, which comprises a bin for placing the frames;
        a frame grabbing assembly, comprising a clamping module and an inner support module, wherein the clamping module is used to clamp the frames and remove them from the bin, and the inner support module is used to spread them apart from an inside of the frames; and
        a mattress spring clamping assembly, used for clamping and fixing the mattress springs;
    a non-woven fabric folding assembly, comprising a folding plate that can fold non-woven fabric at an edge of each mattress spring after it is fitted with one of the frames;
    a mattress spring butterfly spring nailing mechanism, used for installing butterfly springs on sides of the mattress springs, comprising:
        a butterfly spring loading assembly, comprising a rack for placing butterfly springs;
        a butterfly spring clamping assembly, comprising a clamping robot for gripping the butterfly springs and placing them on the sides of the mattress springs;
        a mattress spring positioning and lifting assembly, used to lift the mattress springs from the roller conveyor line and clamp and fix the mattress springs; the mattress spring positioning and lifting assembly comprises a positioning module and a lifting module arranged below the positioning module and configured to pass through the roller conveyor line to lift the mattress springs from the roller conveyor line and to reach the positioning module; the positioning module can position and fix the mattress springs; and
        a butterfly spring nailer, used for nailing on sides of the mattress springs to fix the butterfly springs on the sides of the mattress springs;
    wherein,
    the clamping module comprises a clamping jaw, a clamping jaw cylinder, and a telescopic cylinder; wherein the clamping jaw cylinder drives the clamping jaw to clamp the frames, and the telescopic cylinder drives the clamping jaw and the clamping jaw cylinder to translate;
    the inner support module comprises a steel wire support plate and a driving cylinder, wherein the driving cylinder is connected to the steel wire support plate and configured to drive the steel wire support plate to translate;
    the mattress spring clamping assembly comprises a positive clamping plate module, a positive clamping plate driving mechanism, a side clamping block module, and a side clamping block driving module, wherein:

the positive clamping plate module comprises two symmetrical clamping plates arranged on the roller conveyor line to clamp front and rear sides of the mattress springs;

the positive clamping plate driving mechanism drives the two clamping plates in the positive clamping plate module to move to clamp the mattress springs or retract to avoid the mattress springs;

the side clamping block module comprises two symmetrical clamping blocks arranged on the roller conveyor line to clamp the left and right sides of the mattress spring; and the side clamping block driving module drives two clamping blocks in the side clamping block module to move and clamp the mattress springs;

the folding plate is provided with a bend, and the folding plate comprises a support plate and an edge hook plate connected to the support plate; the edge hook plate is not on the same plane as the support plate, and is inclined towards a side-near adjacent to the non-woven fabric to be folded;

the non-woven fabric folding assembly also comprises a rotating mechanism including a transmission structure; the transmission structure comprises a lifting support, a transmission plate, a connecting rod, and a rod seat; one end of the connecting rod is hinged to a first end of the lifting support, and another end of the connecting rod is hinged to the rod seat; the rod seat is fixedly arranged on the transmission plate, and a second end of the lifting support is hinged to the transmission plate; the folding plate is fixedly connected to the transmission plate; the rotating mechanism further comprises a driving structure including a lifting driving cylinder that can drive the lifting support to lift and lower; the driving structure further comprises a base, on which a linear lifting track is provided, and the lifting support is movable on the linear lifting track with the help of a slider; and the mattress spring frame assembly mechanism further comprises a frame nailing assembly that is arranged above the roller conveyor line and corresponds to the positioning module, for nailing and fixing at the position of non-woven fabric wrapped around the frames of the mattress springs; the frame nailing assembly comprises a plurality of nail guns arranged above the roller conveyor line, each nail gun being connected to a three-axis driver; the three-axis driver can drive the nail gun to move and fix nails at positions of the frames of the mattress springs that are wrapped around by the non-woven fabric.

2. The automatic assembly line for the mattress springs according to claim 1, wherein the steel wire support plate is equipped with a positioning clamping block at a corner, wherein the positioning clamping block is provided with an inwardly concave circular arc groove; a bending part of the frames can be clamped in the circular arc groove.

3. The automatic assembly line for the mattress springs according to claim 1, wherein the clamping module further comprises a guide chuck plate, wherein a slot is provided at a bottom of the guide chuck plate, and the guide chuck plate is arranged parallel to the clamping jaw.

4. The automatic assembly line for the mattress springs according to claim 1, wherein an end of the edge hook plate adjacent to the non-woven fabric to be folded is provided with a guide slope, and an end of the guide slope is provided with a serrated surface.

5. The automatic assembly line for the mattress springs according to claim 1, further comprising a mattress spring front frame installation station and a mattress spring back frame installation station, and the structures of the two installation stations are the same; a mattress springs flipping device is arranged between the two installation stations, which is used to flip the mattress spring 180 degrees.

* * * * *